United States Patent
Wang et al.

(10) Patent No.: US 11,582,102 B2
(45) Date of Patent: Feb. 14, 2023

(54) SYSTEMS AND METHODS FOR INTEGRATING NETWORK SWITCH MANAGEMENT WITH COMPUTING RESOURCE MANAGEMENT

(71) Applicant: Arista Networks, Inc., Santa Clara, CA (US)

(72) Inventors: Shengda Wang, Los Gatos, CA (US); Jialiu Wang, Santa Clara, CA (US); Richard Forster, San Francisco, CA (US); Weifan Fu, Santa Clara, CA (US); Prashant Gandhi, San Jose, CA (US); Kanzhe Jiang, Los Altos Hills, CA (US); Sudeep Modi, Milpitas, CA (US); Shunjia Yu, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 43 days.

(21) Appl. No.: 17/022,706

(22) Filed: Sep. 16, 2020

(65) Prior Publication Data

US 2021/0111946 A1 Apr. 15, 2021

Related U.S. Application Data

(60) Provisional application No. 62/914,922, filed on Oct. 14, 2019.

(51) Int. Cl.
*H04L 41/082* (2022.01)
*H04L 49/00* (2022.01)
*H04L 49/25* (2022.01)
*H04L 67/10* (2022.01)
*H04L 49/351* (2022.01)

(52) U.S. Cl.
CPC ............ *H04L 41/082* (2013.01); *H04L 49/25* (2013.01); *H04L 49/70* (2013.01); *H04L 67/10* (2013.01); *H04L 49/351* (2013.01)

(58) Field of Classification Search
CPC ....... H04L 41/082; H04L 49/25; H04L 49/70; H04L 49/351; H04L 67/10
See application file for complete search history.

(56) References Cited

U.S. PATENT DOCUMENTS

| 10,356,008 | B2* | 7/2019 | Clarke | H04L 12/46 |
|---|---|---|---|---|
| 2008/0137654 | A1* | 6/2008 | Lee | H04L 47/825 370/395.5 |
| 2015/0003595 | A1* | 1/2015 | Yaghi | H04M 3/5175 379/85 |
| 2015/0124823 | A1 | 5/2015 | Pani et al. | |
| 2015/0271303 | A1 | 9/2015 | Neginhal et al. | |
| 2016/0021032 | A1 | 1/2016 | Maier et al. | |
| 2019/0327542 | A1* | 10/2019 | Rivaud | H04L 49/15 |

* cited by examiner

*Primary Examiner* — Sm A Rahman
(74) *Attorney, Agent, or Firm* — Treyz Law Group, P.C.; Tianyi He

(57) ABSTRACT

A networking system may include a switch coupled to a computing resource. A resource management system may control the computing resource. A controller may be coupled to the switch. The controller may include a resource management interface that is coupled to the resource management system via a communications link. The resource management interface may receive computing resource information for the computing resource via the communications link. The controller may provide control data to the switch to update a cloud network for the computing resource based on the received computing resource information.

20 Claims, 12 Drawing Sheets

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ... | SEND TO PORT 4 |
| * | * | * | * | * | * | 80 | | DROP |

FIG. 4

SYSTEMS AND METHODS FOR INTEGRATING NETWORK SWITCH MANAGEMENT WITH COMPUTING RESOURCE MANAGEMENT This patent application claims the benefit of U.S. provisional patent application No. 62/914,922, filed Oct. 14, 2019, which is hereby incorporated by reference herein in its entirety.

BACKGROUND

This relates to communication networks, and more particularly, to communications networks having network switches that are controlled by controller circuitry.

Packet-based networks include network switches. Network switches are used in forwarding network traffic (e.g., packets) between end hosts (e.g., from packet sources to packet destinations). Network switch controller circuitry can be used to control the network switches in forwarding network traffic.

In some applications, computing hardware such as network racks of server hardware form packet sources and packet destinations. As an example, the server hardware may provision and instantiate computing resources (e.g., compute and/or storage resources) across different network racks as needed to form the end hosts for the network switches. One or more computing resource management systems (e.g., cloud orchestration systems or platforms) are often used by a user to collectively instantiate one or more of these computing resources as computing clusters across the server hardware.

Because the control and management of network switches are separate from the orchestration and management of these computing resources, it can be tedious for a user seeking to deploy applications using these computing resources to separately control, monitor, and modify the networking fabric such as by configuring the network switches. As an example, a user may be required to manually gather computing resource information and manually input control parameters to facilitate the control and management of the network switches in forming the complex connections between the computing resources and organizing these connections in meaningful manner. These issues are further exacerbated by the large number of computing resources typically employed and by the number of different orchestration and management systems available to be used, among other considerations. Such constraints can delay the deployment of applications based on these computing resources connected by the network switches.

It is within this context that the embodiments described herein arise.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with some embodiments.

DETAILED DESCRIPTION

Figure 1:
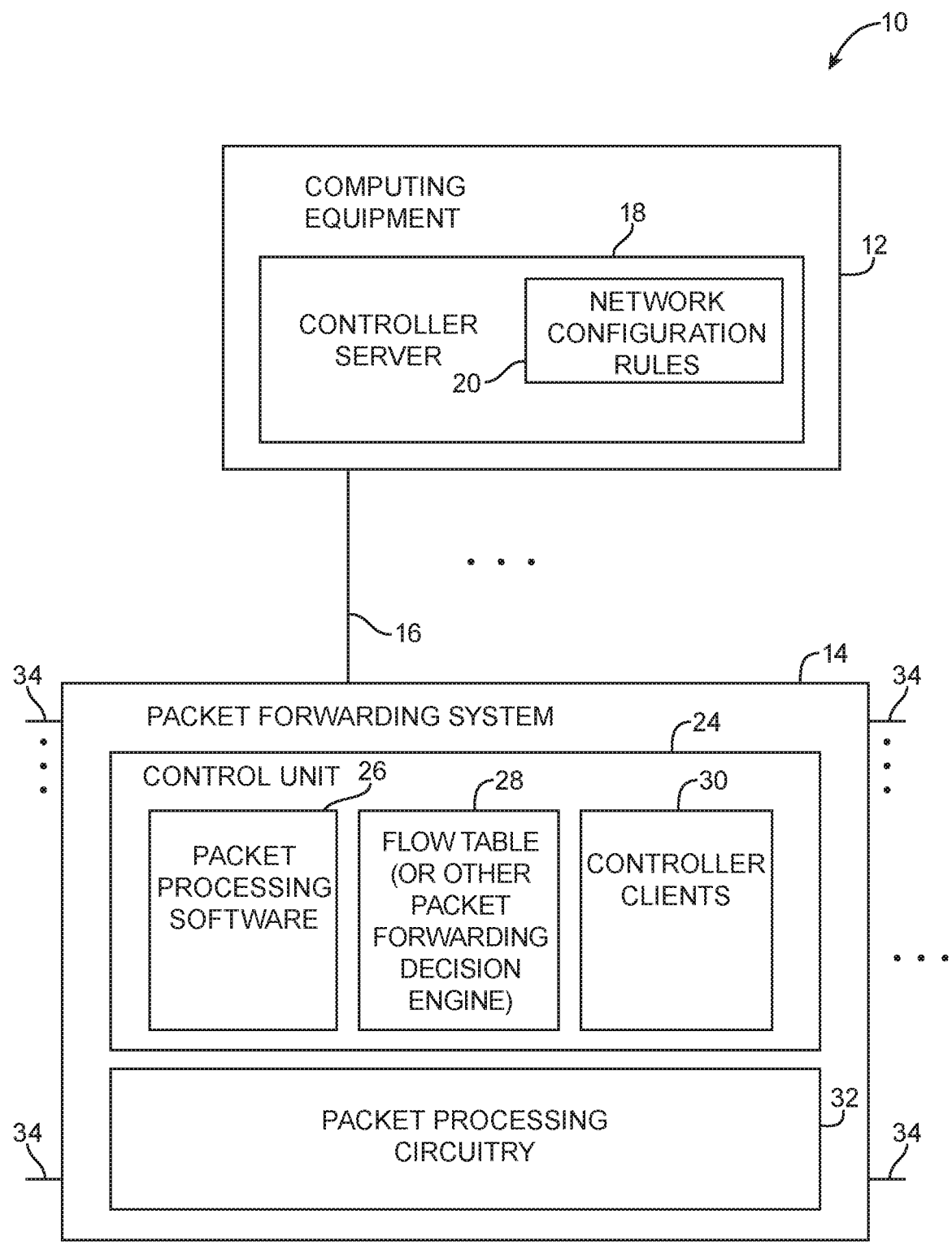
FIG. 1 is a diagram of an illustrative network that includes controller circuitry and a packet forwarding system in accordance with some embodiments.

A controller is configured to control a plurality of network switches, while one or more resource management systems are configured to control a plurality of computing resources (e.g., compute and/or storage resources, computing or processing circuitry, storage circuitry, networking circuitry configured to form logical network elements, and/or other network circuitry, which are generally referred to as computing resources herein) coupled to the network switches. Because the control and management of network switches are separate from the orchestration and management of these computing resources, it can be tedious for a user seeking to deploy applications using these computing resources to separately control, monitor, and modify the networking fabric such as by configuring the network switches.

To mitigate these issues, the controller is communicatively coupled to the resource management system(s). As an example, the controller includes an interface for establishing a communications link such as application programming interface with a resource management system. Through the communications link, the controller can access resource information for computing resources under the management of the resource management system. Therefore, when updates to the computing resources are made by the resource management system, the controller may similarly make corresponding updates to the networking fabric automatically in response. In such a manner, the control and management of the network switches are more closely integrated with the orchestration and management of the computing resources. This also provides a scalable approach in terms of integrating with a large number of resource management systems controlling a vast number of computing resources.

In accordance with some embodiments, the resource management system may be a cloud orchestration platform configured to control computing resources implemented by computing equipment in network racks. The controller can thereby use the computing resource information received through the communications link to configure the networking fabric (e.g., the network switches) to form and/or update the corresponding the cloud network for the cloud orchestration platform.

The network switches, the controller for the network switches, the computing resource, the resource management system(s) for the computing resources, and other elements in accordance with the present embodiments are described in further detail herein.

Controller and Switch Components

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. Packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server (sometimes referred to herein as controller circuitry or management circuitry) may interact with each of the control clients over respective network links. The use of a cross-platform controller and corresponding controller clients allows potentially disparate network switch equipment to be centrally managed.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Computing equipment 12 may include processing and memory circuits (e.g., one or more microprocessors, memory chips, non-transitory computer-readable storage media, and other control circuitry) for storing and processing control software (e.g., the functions of controller server 18). Controller server 18 can run as a single process on a single computer or can be distributed over several hosts for redundancy. The use of a distributed arrangement may help provide network 10 with resiliency against unexpected network partitions (e.g., a situation in which one or more network links between two network portions is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data (e.g., configuration data) to the hardware in network 10 (e.g., switch hardware) to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20 (e.g., network policy information, user input information). Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as ports or network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, non-transitory computer-readable storage media, and other control circuitry) for storing and running control software, and may sometimes be referred to as control circuit 24. Control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As one particular example, packet forwarding decision engines may direct packet forwarding system 14 to forward network packets to predetermined ports based on attributes of the network packets (e.g., based on network protocol headers).

In general, the packet forwarding decision engine may perform any suitable type of processing (associated with any corresponding networking protocol) to assist packet forwarding system 14 in making forwarding decisions of network packets. Configurations in which a forwarding network includes switches storing flow tables useable in making switching, forwarding, and routing decisions are described herein as illustrative examples. The principles of the embodiments described herein may similarly be implemented in forwarding networks that include switches or network elements of other types (e.g., switches or packet forwarding systems that omit flow tables, switches or other network elements that utilize non-flow-table-based switching and routing schemes, switches or other network elements that utilize any suitable network switching or routing protocols, etc.).

In accordance with some illustrative embodiments described herein, any desired switch may be provided with controller clients that communicate with and are controlled by a controller server. For example, switch 14 may be implemented using a general-purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. Switch 14 may be implemented as commodity or white box switches, if desired. The controller server may, if desired, be implemented on one or more line cards in the rack-based system, in another rack-based system, or on other computing equipment (e.g., equipment separate from the rack-based system) that is coupled to the network.

Figure 2:
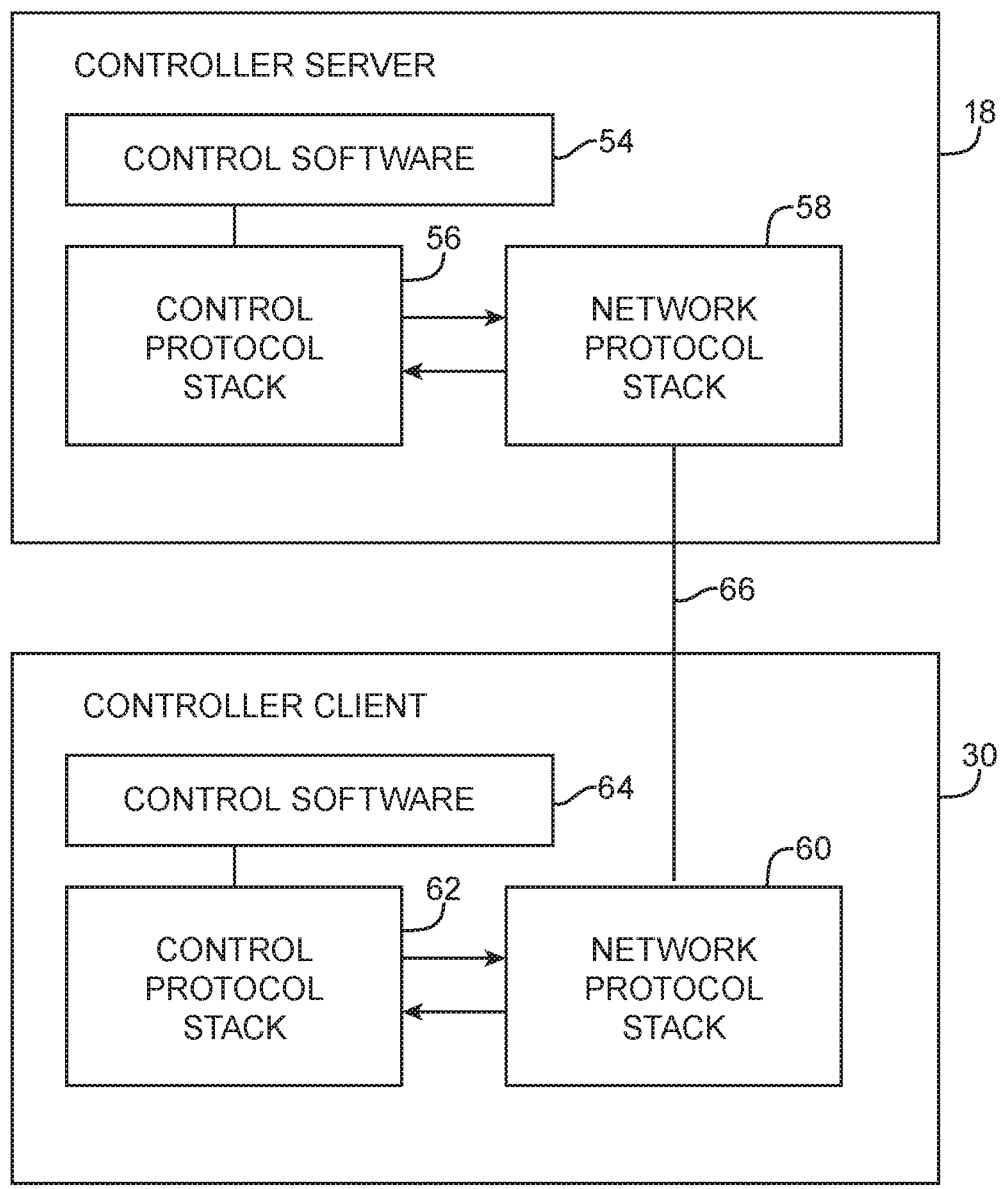
FIG. 2 is a diagram of a controller server and controller client that may communicate over a network connection in accordance with some embodiments.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stack 56 generates and parses control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Flow Table Entries and Packet Processing

Figure 3:
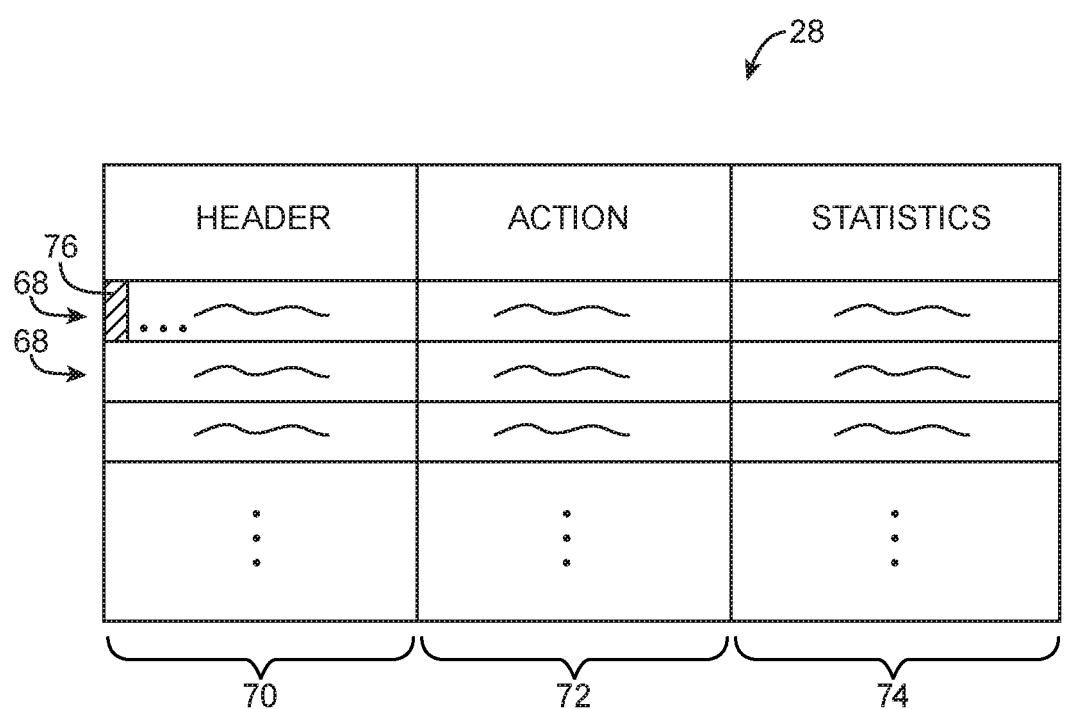
FIG. 3 is a diagram of an illustrative flow table of the type that may be used by a packet processing system in accordance with some embodiments.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped.

The examples of flow table entries in FIG. 3 are merely illustrative. If desired, each flow table entry may be translated to one or more entries in multiple corresponding application-specific integrated circuit (ASIC) forwarding tables (e.g., tables for a network switch integrated circuit forming switch 14) by the corresponding client on each switch 14. These flow table entries may be conveyed to and stored at controller client 30 (FIG. 2) in any suitable format (e.g., these flow table entries are a representation of various packet forwarding schemes useable by different network switch circuitry architectures. In other words, depending on the specific configuration of switch 14 (e.g., the type of networking switch control unit or architecture, the type of packet processing circuitry architecture, the type of forwarding ASIC programming architecture, the ASIC-specific implementation of switch 14), any suitable representation of each flow table entry may be stored at and used by switch 14 (and/or at controller server 18).

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets). The entries of the table in FIG. 4 may be used to perform ethernet switching, internet routing, and firewalling. If desired, table entries performing any suitable networking functions may be used.

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
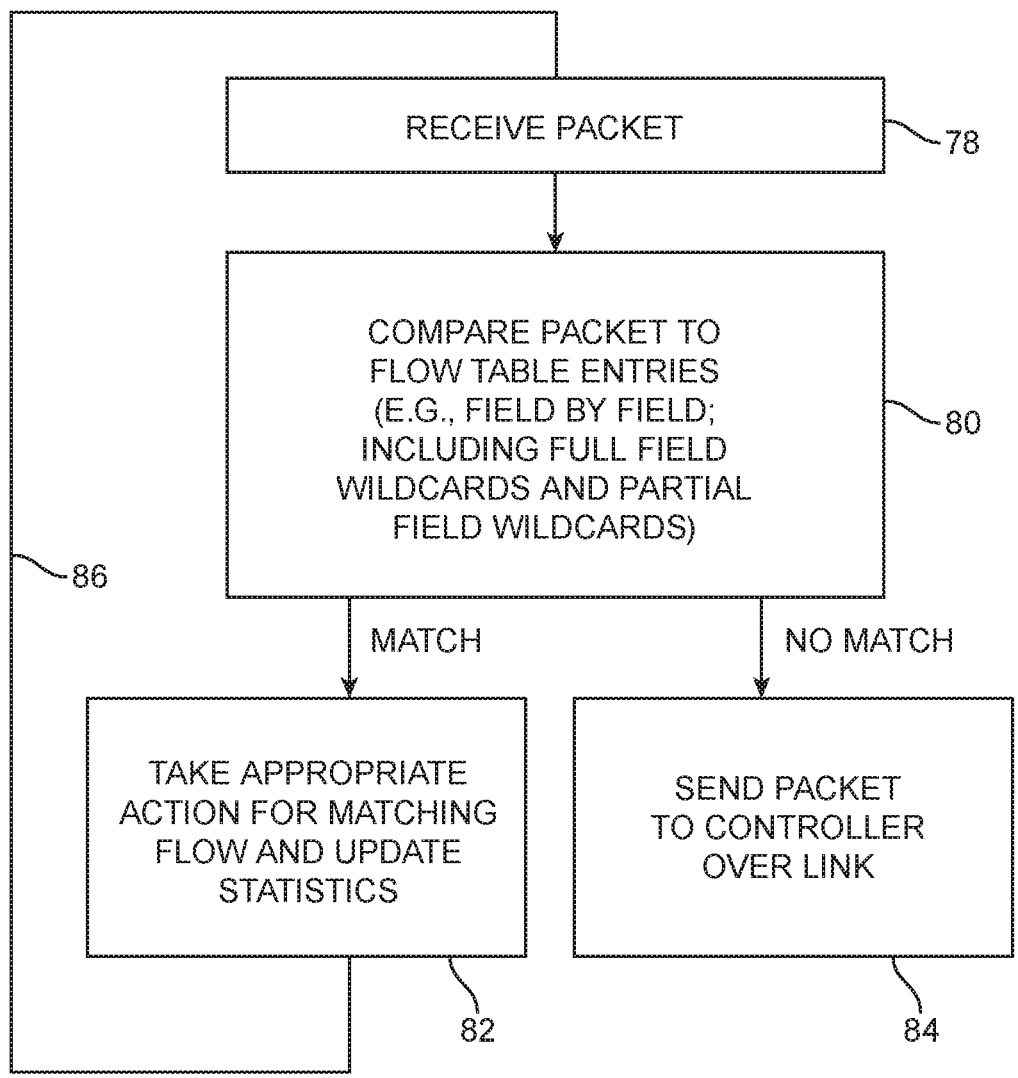
FIG. 5 is a flowchart of illustrative steps involved in processing packets in a packet processing system in accordance with some embodiments.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1). At step 80, switch 14 compares the fields of the received packet to the fields of the flow table entries in the flow table 28 of that switch to determine whether there is a match and to take one or more corresponding actions defined by the flow table entries. If it is determined during the operations of step 80 that there is no match between the fields of the packet and the corresponding fields of the flow table entries, switch 14 may send the packet to controller server 18 over link 16 (step 84). If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Network Configuration

Figure 6:
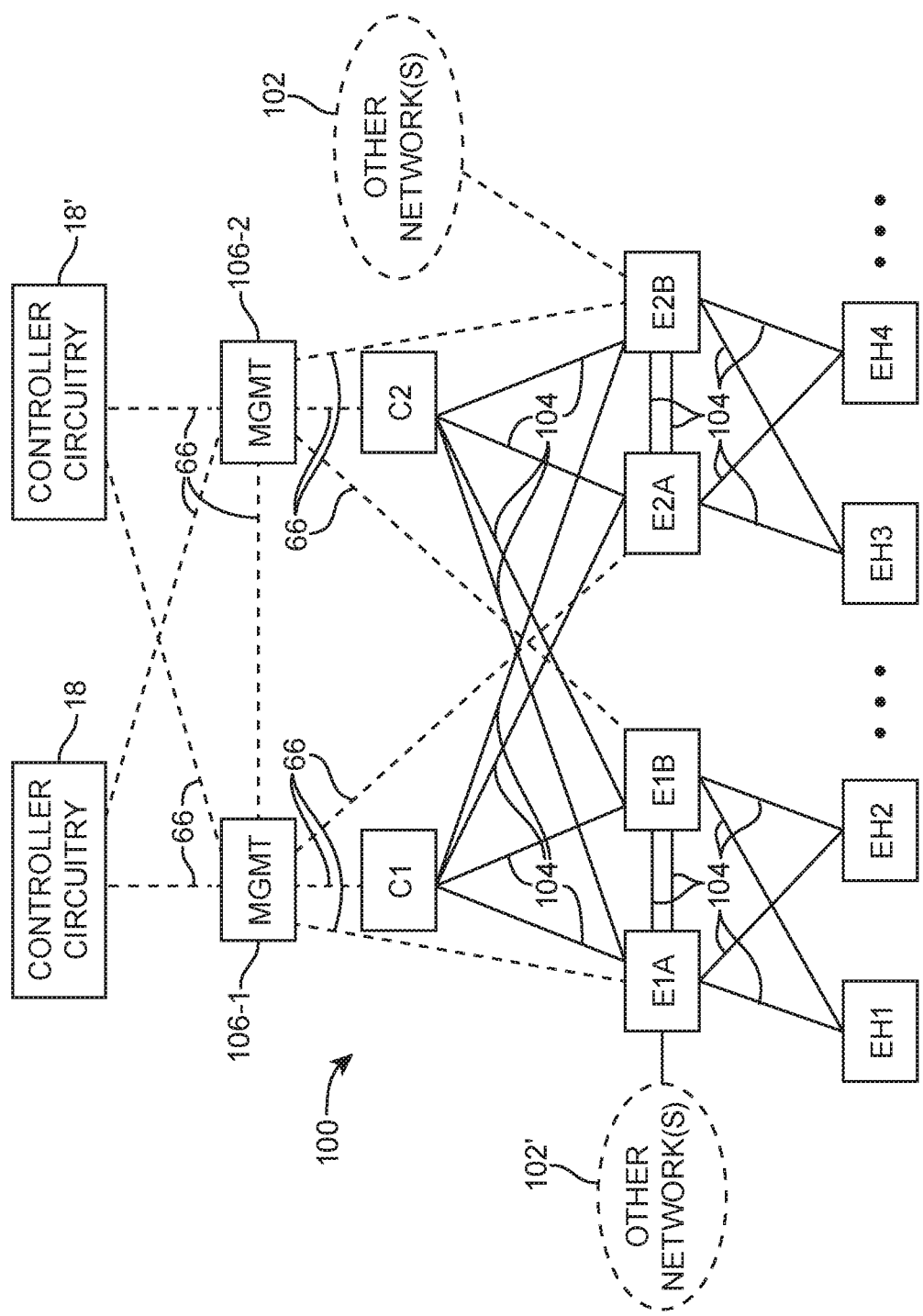
FIG. 6 is a diagram of an illustrative underlying network having two different tiers of switches that may be controlled by controller circuitry for forwarding (e.g., routing) network packets between end hosts in accordance with some embodiments.

FIG. 6 is a diagram of an illustrative network 100 in which switches may be controlled by a controller 18 (sometimes referred to herein as controller circuitry, management circuitry, a controller or management module, or a controller or management system). Controller 18 may be a controller server or a distributed controller implemented across multiple computing equipment. As shown in FIG. 6, network switches may be controlled by an active controller 18. If desired, a backup controller 18' may be activated and may provide back-up and/or auxiliary control when one or more portions of controller 18 is inactive (e.g., due to device failure, device diagnostics, etc.)

Controller 18 (or controller 18' when active) may provide control and configuration data (e.g., control signals, configuration data such as switch flow table entries, routing table associations, test packets, probe packets, etc.) for controlling network 100 to management devices 106-1 and 106-2 via paths 66. Switch management devices 106-1 and 106-2 may further distribute the control and configuration data across switches in network 100 via paths 66, each of which may be formed from a corresponding wired connection. If desired, management devices 106-1 and 106-2 may be physically separate from portions of controller 18 to more conveniently perform switch management functions. For clarity, management devices 106-1 and 106-2, may be considered to form a portion of controller 18, and are separately shown in FIG. 6 for illustrative purposes.

As shown in FIG. 6, network 100 includes switches C1, C2, E1A, E1B, E2A, and E2B. Controller 18 is coupled to the switches of network 100 via control paths 66. Controller 18 controls the switches using control paths 66 (e.g., by providing flow table entries such as flow table entries 68 of FIG. 3). As described herein as examples, switches C1, C2, E1A, E1B, E2A, and E2B in network 100 may be configured in the manner described in connection with FIGS. 1-5.

Network 100 includes end hosts such as end hosts EH1, EH2, EH3, and EH4 that are coupled to the switches of network 100 (e.g., to switches E1A, E1B, E2A, and E2B). Switches that are directly coupled to end hosts are sometimes referred to as edge switches or leaf switches, whereas switches that merely interconnect other switches and are not directly coupled to the end hosts are sometimes referred to as core switches or spine switches. In the example of FIG. 6, switches E1A, E1B, E2A, and E2B are edge switches, because they are directly coupled to end hosts. Switches C1 and C2 are core switches, because switches C1 and C2 interconnect switches E1A, E1B, E2A, and E2B and are not directly coupled to end hosts. Edge switches such as switch E2B (and/or switch E2A) couple network 100 to other networks 102 (e.g., other networks including switches and end hosts, other networks external to network 100, the Internet, etc.). If desired, other networks 102' may be coupled to edge switch E1A (and/or E1B) in addition to or instead of other networks 102 coupled to edge switches E2A and/or E2B. In general, one or more other networks may be coupled to any suitable (edge) switch in network 100.

As shown in FIG. 6, switch C1 is coupled to switches E1A, E1B, E2A, and E2B (at different corresponding ports of switch C1) via corresponding data paths 104 sometimes referred to herein as packet forwarding paths. Similarly, switch C2 is coupled to each of the four edge switches (at different corresponding ports of switch C2) via corresponding data paths 104. These data paths 104 couple corresponding edge switches to respective end hosts at different corresponding ports of the respective edge switches and provide peer connections between edge switches. As shown in FIG.

6, control paths 66 in the control plane are separate from the data paths 104 in the data plane. However, if desired, one or more portions of control paths 66 may include one or more portions of data paths 104.

Figure 7:
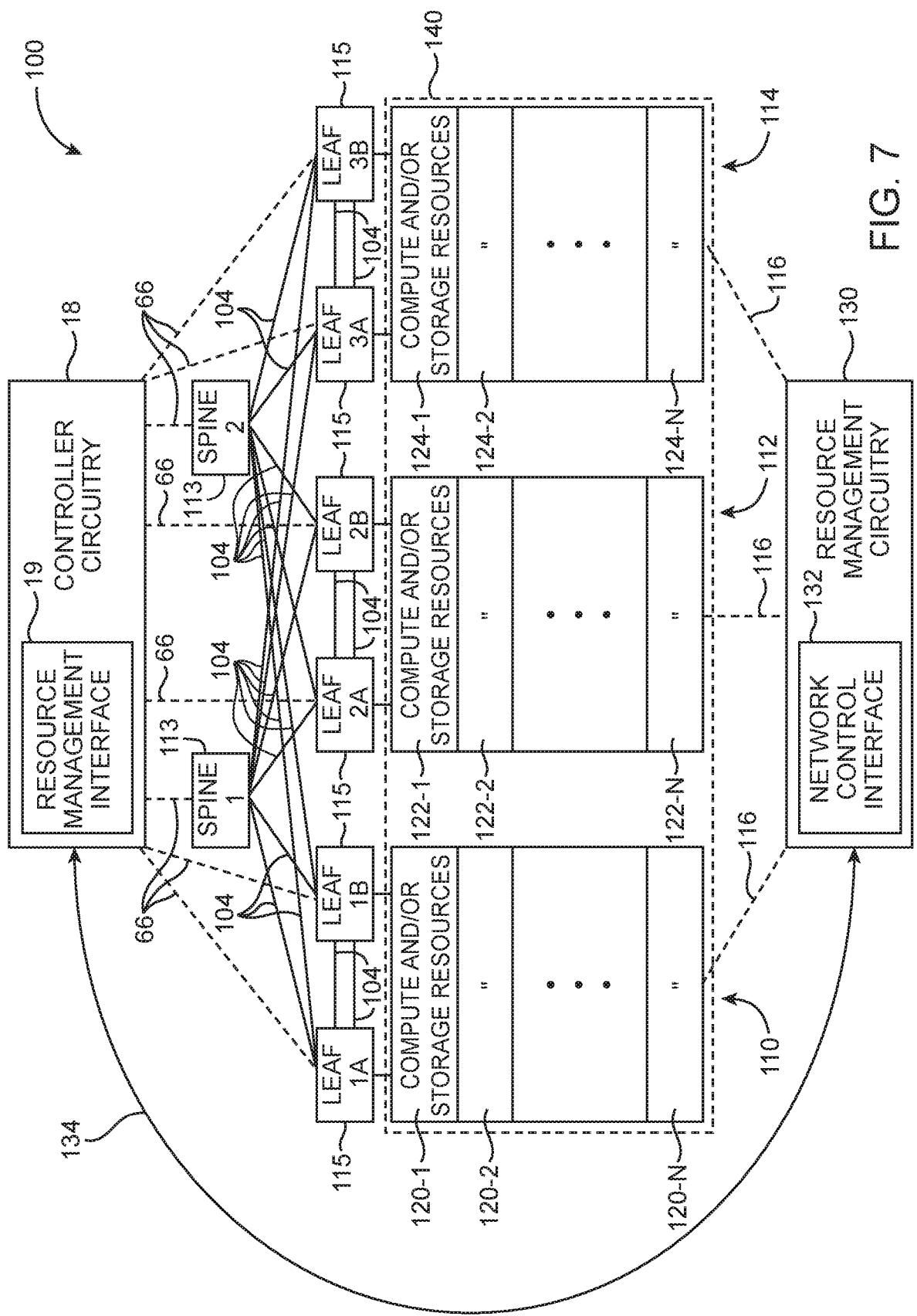
FIG. 7 is a diagram of an illustrative rack-based system having network switch controller circuitry communicatively coupled to computing resource management circuitry in accordance with some embodiments.

FIG. 7 is an illustrative example of a network such as network 100 of FIG. 6 when implemented using a rack-based system. As shown in FIG. 7, leaf switches 115 (referred to as edge switches in FIG. 6) and end hosts are implemented using network racks 110, 112, and 114 that are coupled to spine switches 113 (referred to as core switches in FIG. 6). Network rack 110 includes leaf switches 1A and 1B and compute and/or storage resources 120 (e.g., 120-1 to 120-N), some of which may form end hosts EH1 and/or EH2 in FIG. 6. Network rack 112 includes leaf switches 2A and 2B and compute and/or storage resources 122 (e.g., 122-1 to 122-N), some of which may form end hosts EH3 and/or EH4 in FIG. 6.

If desired, network 100 may include additional network racks that house additional end hosts and switches, which are coupled to spine switches 113 or other spine switches. In the example of FIG. 7, network 100 also includes rack 114 and corresponding connections to other elements in network 100. In particular, network rack 114 includes leaf switches 3A and 3B and compute and/or storage resources 124 (e.g., 124-1 to 122-N). In the example of FIG. 7, compute and/or storage resources 120, 122, and 124 (e.g., generally implementing compute, store, manage, and/or any other functions, and generally referred to herein as computing resources 120, 122, and 124) may form the end hosts for network 100. Arrangements in which end hosts 120, 122, and 124 are formed from racks of server hardware used to implement computing resources (e.g., compute and/or storage resources, computing or processing circuitry, storage circuitry, network management circuitry configured to form logical network elements, and/or other networking circuitry, which are generally referred to as computing resources herein) are described herein as illustrative examples. Configurations in which each of computing resources (e.g., each of computing resources 120-1, 120-2, 122-1, 122-2, etc.) is a corresponding virtual machine are described herein as example. If desired, end hosts 120, 122, and 124 may be formed from any suitable hardware or equipment.

In the example of FIG. 7, leaf switches 1A, 1B, 2A, 2B, 3A, and 3B serve as top-of-rack switches that may each be coupled via corresponding network paths (e.g., data forwarding paths) to each end host of the corresponding network rack. These network paths are not explicitly shown in order not to unnecessarily obscure the embodiments of FIG. 7. However, as a particular illustrative example, top-of-rack switch 2A may be connected to each of the end hosts of network rack 112 (e.g., each of computing resources 122, and any other end hosts within network rack 112). The analogous connections to corresponding computing resources or end hosts may be made for each of the top-of-rack switches.

Each top-of-rack switch serves as an interface between end hosts of the corresponding network rack and other network devices such as other portions of network 100 or other networks (e.g., external network 102 coupled to a leaf switch in FIG. 6). Network traffic to or from end hosts of network rack 110 may be required to traverse at least one of the top-of-rack switches of network rack 110 (e.g., one of top-of-rack switches 1A and 1B). Similarly, network traffic of network rack 112 may be required to traverse at least one of switches 2A and 2B, and network traffic of network rack 114 may be required to traverse at least one of switches 3A and 3B.

If desired, switches may be implemented using computing equipment of network racks 110, 112, and/or 114. In other words, one or more of leaf switches in network 100 may be implemented using one or more corresponding software switches. As an example, a software switch may be implemented using computing equipment such as an end host of network rack 110 (e.g., a computing resource 120 in network rack 110). The software switch may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

The software switch may interface with end hosts in the corresponding rack (e.g., in the same rack in which the software switch is formed). In other words, shared computing equipment (e.g., computing resources in a given network rack) may be used to implement the software switch and the end hosts with which the software switch is interfaced. If desired, multiple end hosts (e.g., computing resources 120, 122, or 124) may be implemented in software on the shared computing equipment. For example, tens, hundreds, thousands, or more end hosts may be implemented on the shared computing equipment and logically coupled in software to logical ports of the software switch, whereas the software switch is connected to other physical switches in network 100 by physical ports of the shared computing equipment on which the software switch itself is implemented.

The network configurations of FIGS. 6 and 7 are merely illustrative. If desired, network 100 may include any number of spine and leaf switches coupled to any number of end hosts implemented using any suitable computing equipment (e.g., using any suitable number of network racks of server hardware).

In the example of FIG. 7, controller 18 is implemented separately from racks 110, 112, and 114 and is configured to control spine switches 113 and leaf switches 115 via control paths 66. However, if desired, controller 18 may be implemented in a network rack (e.g., using the resources of a line card or other computing equipment of network rack 110 and/or any other network rack). Controller 18 may communicate with the top-of-rack switches and core switches by sending control packets and receiving control plane packets from the switches.

Resource Management System Integration

Still referring to FIG. 7, resource management circuitry 130 is configured to control and manage (e.g., orchestrate) distributed computing resources implemented at computing equipment on network racks 110, 112, and 114 via control paths 116. In particular, each of the computing resources 120, 122, or 124 may be implemented on corresponding (or shared) computing equipment (e.g., server hardware, rack hardware, or any other types of computing hardware) disposed in racks 110, 112, or 114. Resource management circuitry 130 may configure the computing equipment to provision corresponding computing resources (e.g., configure the computing resources to be useable to perform a compute function, a storage function, a management function, and/or any other functions) for use by an application (e.g., for a user application) and to instantiate the corresponding computing resources (e.g., create instances of computing resources having the compute, storage, management, and/or other functions, create one or more virtual machines, etc.) when actively employed.

Each rack may include multiple pieces of separate computing equipment, each of which may be configured to provision multiple computing resources. Each of these computing resources may be a corresponding end host for network 100. Resource management circuitry 130 may selectively instantiate one or more computing resources across racks 110, 112, and 114 to suitably implement a function for an application. The instantiated computing resources may operate as a cluster (e.g., a computing resource cluster) to perform any suitable functions. In such a manner (e.g., by selectively instantiating resources), resource management circuitry 130 can control and management (e.g., orchestrate) the distributed computing resources as a collective computing cluster 140 (e.g., as a cloud computing cluster for an enterprise cloud application).

The computing equipment used to implement computing resources for compute and storage functions may themselves sometimes be referred to computing resources (e.g., the hardware enabling computing resources 120-1, 120-2, etc., computing resources 122-1, 122-2, etc., and computing resources 124-1, 124-2, etc.). These computing resources when implemented in a rack-based system are sometimes referred to herein as rack resources, and these computing resources when useable to implement computing resources for cloud applications (e.g., in instantiated clusters of one or more compute and/or storage resources) are sometimes may be referred to herein as cloud resources.

Resource management circuitry 130, when controlling the distributed computing resources to deploy applications, may require the collaboration of controller 18 for controlling network 100 of switches 113 and 115. However, because resource management circuitry 130 and controller 18 are often implemented using disparate systems (e.g., separately organized, provided by different vendors, serve different functions, etc.), difficulties and inefficiencies may arise during the deployment process. As an example, a user may be required to bridge any gaps in information between the two systems when deploying an application (e.g., by manually transferring the information for resources instantiated by resource management circuitry 130 to controller 18, manually inputting control parameters for network 100, etc.). Doing so for large networks using large numbers of computing resources is time-consuming and prone to mistakes, and can therefore delay application deployment.

To more seamlessly integrate computing resource information from resource management circuitry 130 into the control scheme of controller 18, controller 18 may form a communications link with resource management circuitry 130 and may control network switches to organize network 100 based on the computing resource information from resource management circuitry 130 (e.g., information for the instantiated computing resources).

In the example of FIG. 7, controller 18 is coupled to cloud resource management circuitry 130 via one or more communications links 134. Arrangements in which the one or more communications links 134 are implemented in software through one or more corresponding application programming interfaces (APIs) over a network connection (e.g., a set of software instructions allowing access of data or information between controller 18 and resource management circuitry 130) are described herein as an example. In particular, controller 18 and/or management circuitry 130 may include corresponding storage circuitry configured to store the software instructions for establishing and using the one or more APIs and may include processing circuitry configured to process the software instructions.

However, this example is merely illustrative. If desired, communications link 134 may generally include a portion implemented based on hardware such as a link using one or more cables and networking equipment, using a wireless link between wireless transmitters and receivers, using processing circuitry processing software instructions for implementing the communications link, or using any other suitable hardware. If desired, communications link 134 may generally include a portion implemented based on software such as software instructions implemented on first and second computing equipment establishing a connection therebetween, a communications or networking protocol between two systems, or any other suitable links based on software. In general, any suitable manner for communication between the two systems may be employed.

To effectively communicate with resource management circuitry 130 using link 134, controller 18 includes resource management interface 19 (sometimes referred to as resource management integration software). Resource management interface 19 may be implemented by processing software instructions stored at storage circuitry on controller 18 and/or implemented by dedicated interface circuitry on controller 18, as examples. As an example, resource management interface 19 may request data over link 134 from resource management circuitry 130 and may parse and process any data (e.g., computing resource information) received from resource management circuitry 130. Resource management interface 19 may consequently provide the received data to other portions of controller 18 to control corresponding network switches (e.g., while processing control software 54 in FIG. 2).

On the other side, to effectively communicate with controller 18 using link 134, resource management circuitry 130 may include network control interface 132 (e.g., sometimes referred to as controller plugin software). Network control interface 132 may be implemented by processing software instructions stored at storage circuitry on resource management circuitry 130 and/or implemented by dedicated interface circuitry on resource management circuitry, as examples. Network control interface 132 may be configured to selectively allow access of cloud resource management circuitry 130 by controller 18 via link 134. In particular, network control interface 132 may provide resource information (e.g., available computing resource information, instantiated computing resource information, etc.) from resource management circuitry 130 (e.g., storage circuitry in resource management circuitry 130, a database stored on memory circuitry in resource management circuitry 130, etc.) to controller 18 over link 134. In particular, resource management interface 19 in controller 18 may interact directly with network control interface 132 when communicating with resource management circuitry 130. As an example, when one or more application programming interfaces are used to implement link 134, and resource management interface 19 and network control interface 132 may serve as the access points or endpoints for the one or more application programming interfaces.

Resource management interface 19 may be specific to the type of resource management circuitry 130 employed and network control interface 132 may be specific to the type of controller 18 employed may ensure cross-compatibility between the two disparate systems (e.g., controller circuitry 18 and resource management circuitry 130). If desired, other types of interfaces may also be included in controller 18 and/or resource management circuitry 130 to ensure cross-compatibility across a wide variety of systems.

If desired, controller circuitry 18 may receive input such as user input (e.g., through a graphical user interface at one or more input-output circuitry for controller 18) to establish one or more communications links 134 such as one or more APIs. The input may include information identifying a type of resource management circuitry 130 being communicatively coupled, information identifying resource management circuitry 130, information identifying computing resources managed by resource management circuitry 130 (e.g., a number of provisioned computing resources, a number of instantiated computing resources, a number of racks associated with the computing resources, different types of computing resources managed), or any other suitable input.

Switch Port Discovery and Lag Formation

Based on one or more such inputs, controller 18 may establish link 134 with resource management circuitry 130. Controller circuitry 18 may thereafter request and/or access information identifying computing resources managed by resource management circuitry 130 and/or resource management circuitry 130 may convey the information identifying the computing resources or any other suitable information to controller circuitry. Using the received information, controller 18 may integrate the received information into its control scheme and more efficiently perform a number of functions such as identifying interconnections between switches and/or computing resources based on the received information (e.g., automatically in response to the received resource information), forming link aggregation groups (LAGs) based on the received resource information (e.g., automatically in response to identifying suitable groups of interconnections between switches and/or computing resources, forming virtual or logic networking elements using switches 113 and 115 (e.g., automatically in response to the received resource information), and/or any other suitable functions.

In particular, based on the information received from resource management circuitry 130 (e.g., information indicative of the network racks and/or the computing equipment from which one or more computing resources are instantiated), controller 18 may identify one or more switch ports of one or more corresponding switches coupled to the instantiated computing resources. If desired, controller 18 may identify these switch ports by one or more of their corresponding networking information and/or hardware information and may subsequently use and store these sets of information for link aggregation group formation, for forming virtual network elements, etc.

As an illustrative example, resource management system 130 may instantiate computing resources 120-1 and 120-2 (e.g., corresponding virtual machines) in rack 110. Resource management system 130 may convey information associated with the creation of computing resources 120-1 and 120-2 to controller circuitry 18 via link 134. The conveyed information may include information identifying rack 110 at which the computing resources are created, information identifying hardware addresses within rack 110 associated with computing equipment from which computing resources are created (e.g., first and second computing equipment from which computing resources 120-1 and 120-2 are created, respectively), and/or any other information indicative of the interconnections between computing resources 120-1 and 120-1 and switches in network 100. Based on the received information from resource management circuitry, controller 18 may identify switch ports at one or both of leaf switches 1A and 1B coupled to computing resources 120-1 and 120-2.

In this illustrative example, a first port P1 at leaf switch 1A and a first port P1 at leaf switch 1B may each be directly connected to (e.g., without any intervening switch, form a direct connection using wires to, etc.) computing resources 120-1 (e.g., the computing equipment implementing computing resources 120-1). A second port P2 at leaf switch 1A and a second port P2 at leaf switch 1B may each be directly connected to computing resources 120-2 (e.g., the computing equipment implementing computing resources 120-2). In response to receiving the resource information for computing resources 120-1 and 120-2 from resource management system 130, controller 18 may automatically identify ports P1 and P2 at switch 1A and ports P1 and P2 at switch 1B directly connected to computing resources 120-1 and 120-2 (sometimes referred to as the auto-discovery of switch ports).

Controller 18 (and any corresponding switches in network 100) may store and use the information indicative of connections between switch ports and computing resources when perform other suitable networking functions (e.g., forming LAG groups, forming logical networking elements, etc.). The conveyance of resource information from resource management system 130 and therefore the identification of switch port connections to computing resources in response to the resource information may occur at any suitable time such as when link 134 is first established, periodically during operation, when new computing resources are instantiated, when old computing resources are removed, when updates are made to computing resources, etc.

This example of switch ports at leaf switches 1A and 1B having ports directly connected to computing resources 120-1 and 120-2 is merely illustrative. If desired, controller 18 may identify any number of switch ports connected to any number of computing resources depending on the configuration of network 100 and how network 100 is connected to end hosts. In general, controller 18 may use the resource information received over link 134 to identify all switches ports at corresponding switches directly connected to all instantiated and active computing resources coupled to network 100. By performing switch port auto-discovery in such a manner, controller 18 may identify all necessary connections to computing resources without additional user input (e.g., user input indicating each connection of computing resources that have been instantiated), thereby simplifying the setup process for a user.

Furthermore, based on the identified switch port connections to computing resources and based on the resource information conveyed over link 134, controller 18 may form one or more link aggregation groups automatically in response to identifying these switch port connections. In the above example in which controller 18 has identified corresponding ports P1 at switches 1A and 1B connecting to computing resources 120-1 and corresponding ports P2 at switches 1A and 2B connecting to computing resources 120-2, controller 18 may form one or more link aggregation groups based on the four identified connections between the switches and the computing resources. In particular, in response to identifying port P1 at switch 1A and port P1 at switch 1B being connected to computing resources 120-1, controller 18 may form a first link aggregation group from these two connections to computing resources 120-1. In response to identifying port P2 at switch 1A and port P2 at switch 1B being connected to computing resources 120-2, controller 18 may form a second link aggregation group from these two connections to computing resources 120-2. Corresponding switches 1A and 1B (and/or controller 18) may each form and store a link aggregation table having entries each corresponding to a link aggregation group and the switch ports of that switch forming the link aggregation group.

This example of forming first and second LAGs between ports of switches 1A and 1B, and computing resources 120-1 and 120-2 is merely illustrative. If desired, controller 18 may form any number of link aggregation groups having any number of links between switches and the computing resources depending on the configuration of network 100 and how network 100 is connected to end hosts. In particular, controller 18 may form LAGs from links to other instantiated computing resources in network racks 110, 112, and/or 114. If desired, depending on the functions of different computing resources, controller 18 may form a single link aggregation group from connections or links to multiple computing resources. In some scenarios where computing resources 120-1 and 120-2 perform the same functions in parallel, perform redundant functions, are used to for the same application, etc., controller 18 may form a single link aggregation group from the four links to computing resources 120-1 and 120-2 in the above example (instead of two separate link aggregation groups). In a similarly manner, if desired, controller 18 may form a link aggregation group from connections or links across network 100 (e.g., from links at different network racks).

In general, controller 18 may use the resource information received over link 134 and the identified switches port information to form LAGs for each instantiated and active computing resources coupled to network 100 and create corresponding link aggregation tables identifying these LAGs to be stored at respective switches. Controller 18 may receive resource information over link 134 identifying the type, function, and/or application of instantiated computing resources (e.g., whether one or more computing resource are of the same type, have the same function, are used by the same application, etc.) and any other suitable resource information to more suitably form appropriate link aggregation groups with the desired connections or links to computing resources. By performing automatic link aggregation group formation in such a manner, controller 18 may form all necessary LAGs to computing resources without additional user input (e.g., user input indicating from which ports each LAG is formed from), thereby simplifying the setup process for a user.

Network Virtualization and Automation

Additionally, in response to the resource information received over link 134 and based on the switch ports having connections to computing resources and link aggregation groups formed from these connections, controller 18 may form perform network virtualization (e.g., form virtual or logic networking elements from underlying switches 113 and 115). If desired, the formation of these virtual or logical networking elements from switches 113 and 115 in network 100 may be automatic after establishing communications link 134 and resource information from resource management circuitry 130 is readily accessible. If desired, controller 18 may periodically request or access any updates to instantiated resource information to update the virtual or logical network elements in network 100. If desired, resource management circuitry 130 may instantiate computing resources, and may provide the corresponding instantiated computing resource information automatically to controller 18 via link 134 as new computing resources are instantiated, old computing resources are removed, or generally when any updates to the computing resources occurs.

Arrangements in which controller 18 provides control signals and control data (e.g., network switch flow table entries, routing table associates) to form virtual or logical networking elements such as private cloud networking elements in response to the received computing resource information from resource management circuitry 130 are described herein as illustrative examples. If desired, control 18 may using network 100 to form any other suitable types of networking elements in response to the received computing resource information.

In the example of FIG. 7, controller 18 may provide control signals and control data to switches 113 and 115 to form private cloud networking elements such as enterprise virtual private cloud (EVPC) elements (e.g., in scenarios where resource management circuitry 130 is an enterprise cloud management system or platform). The private cloud networking elements include segments, (EVPC) tenants associated with virtual routers, and system (EVPC) tenants associated with a virtual system router (sometimes referred to as a Transit Gateway).

In particular, virtual routers defining the tenants may be implemented by and be referred to as a first set of routing tables (e.g., supplied by controller 18) stored at one or more switches or other network elements. Similarly, virtual system routers defining the system tenants may be implemented by and be referred to as a second set of routing tables (e.g., supplied by controller 18) stored at one or more switches or other network elements. These virtual routers may include interfaces that are assigned and connect to corresponding segments. These virtual router interfaces may be sometimes referred to as associations with a corresponding routing table in the first set of routing tables. Virtual system routers may include interfaces that are assigned or connect to virtual routers or tenants. These virtual system router interfaces may sometimes be referred to as associations with a corresponding routing table in the second set of routing tables. In general, the interfaces for the virtual routers and virtual system routers are defined and implemented by corresponding associations in the corresponding routing tables in the sets of routing tables for the virtual routers and virtual system routers.

Figure 8:
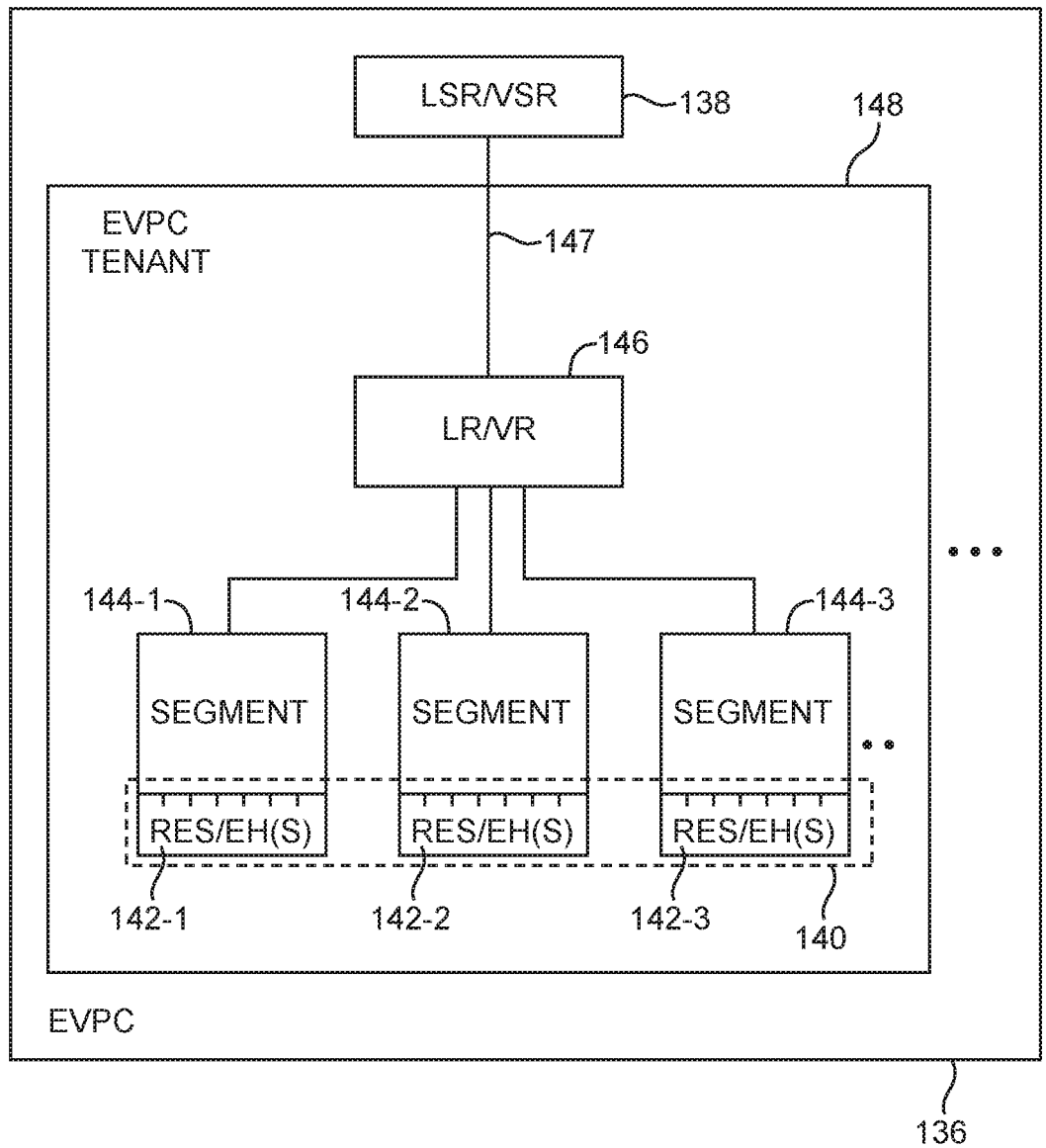
FIG. 8 is a diagram of private cloud elements generated using network switch controller circuitry based on an underlying network of switches and based on computing resource information from computing resource management circuitry in accordance with some embodiments.

FIG. 8 is a diagram of illustrative virtual or logical elements such as EVPC networking elements that may be formed from a network of underlying switches (e.g., from spine switches 113 and leaf switches 115 in network 100 in FIG. 7) based on resource management information from resource management circuitry 130 (FIG. 7) and based on control signals and data from controller 18 (FIG. 7). In the example of FIG. 8, a controller such as controller 18 (FIG. 6 or 7) may configure and control a network of underlying physical and/or software-based switches such as network 100 (FIG. 6 or 7) to form an enterprise virtual private cloud (EVPC) 136 (e.g., EVPC network 136) defined by the networking elements therein such as EVPC tenant 148, segments 144, transit gateway 138 for a system tenant, etc.

Based on resource management information from resource management circuitry 130 (FIG. 7), controller 18 may provide configuration and control data to the underlying switches in network 100 to map elements in EPVC network 136 onto the underlying switches (e.g., by assigning the identifying network attributes of these virtual elements to the underlying switches, by assigning different associations to corresponding routing tables in the underlying switches, etc.). In particular, elements in EVPC network 136 may be updated over time to implement and include any suitable virtual networking elements on the basis of underlying network 100 and based on any updated resource management information from resource management circuitry 130 (FIG. 7).

In the example of FIG. 8, EVPC network 136 includes and defines one or more EVPC tenants, and an EVPC tenant includes and defines one or more network segments associated with one or more computing resources. In particular, EVPC tenant 148 includes segments 144-1, 144-2, and 144-3. Each segment within EVPC tenant 148 may be associated with (e.g., may be further partitioned into) at least one subnet (e.g., defined by a range of IP addresses). Each segment may be implemented to provide direct packet forwarding (e.g., switching) functions within that segment. In the example of FIG. 8, each of segments 144-1, 144-2, and 144-3 includes only one subnet and provides direct switching functions between different end hosts within the corresponding segment (e.g., between end hosts in one of the sets of end hosts 142-1, 142-2, or 142-3, between computing resources 120, 122, and/or 124 in FIG. 7 assigned to the same segment, etc.). If desired, each segment may include multiple subnets (e.g., each defined by a different subset of IP addresses).

Each segment includes ports that are each connected to a suitable number of end hosts within network 100 (e.g., one or more of end hosts EH1, EH2, EH3, or EH4 in FIG. 6 or one or more of computing resources 120, 122, or 124 in FIG. 7). The ports of each segment (sometimes referred to as virtual ports of that segment) are distributed across ports of any corresponding underlying physical and/or software switches (e.g., ports identified through the switch port auto-discovery process described above). In other words, each segment is implemented as a distributed switch across one or more underlying switches (e.g., a virtualized element having distributed processing modules across one or more underlying physical and/or software switches for implementing its functions). These segments may be defined by (e.g., may each have virtual ports assigned to) different network attributes of the corresponding connected end hosts (e.g., defined by protocol addresses or ranges of protocol address of the end hosts such as IP addresses, defined by hardware addresses or ranges of hardware addresses of the end hosts such as MAC addresses, defined by virtual local area network (VLAN) tags of the end hosts, and/or other network attributes of the end host).

As an example, controller 18 controlling switches to form segments in EVPC tenant 148 may identify or characterize an end host (e.g., one of computing resources 120, 122, 124 in FIG. 7 serving as the end host) by a MAC address of the given end hosts (e.g., of the computing equipment implementing the computing resource) and/or a VLAN of the given end host (e.g., of the computing equipment implementing the computing resource), and may identify that the end host (e.g., the computing equipment implementing the computing resource) is coupled to a port of an underlying switch (e.g., identified through the switch port auto-discovery process described above). Accordingly, to assign the given end host to a given segment, controller 18 may define a virtual port of the given segment using the MAC address of the given end host and/or the VLAN of the given end host (e.g., a virtual port may be a combination of a MAC address and a VLAN for the given end host). In other words, the computing equipment implementing the computing resource and coupled to the port of the underlying switch may be assigned to the virtual port of the given segment. Similarly, any other virtual ports of the given segment may be formed from any other suitable end hosts (e.g., computing resources 120, 122, and/or 124) and may be defined by desired network attributes of these end hosts (e.g., MAC addresses and VLANs of computing equipment implementing computing resources 120, 122, and/or 124). In such a manner, a group of end hosts coupled to ports of a set of underlying switches may be assigned to the virtual ports of the given segment.

In the context of integrating the computing resource information from resource management circuitry 130 in FIG. 7 with the control scheme of controller 18 in FIG. 7, controller 18 may receive, over one or more links 134 (FIG. 7), computing resource information for the instantiated computing resources such as networking information (e.g., protocol addresses or ranges of protocol address such as IP addresses of the computing resources or corresponding computing equipment implementing the computing resources, hardware addresses or ranges of hardware addresses such as MAC addresses of the computing resources or the corresponding computing equipment, virtual local area network (VLAN) tags of the computing resources or the corresponding computing equipment, and/or other network attributes of the computing resources and/or the computing equipment implementing the computing resources). If desired, the computing resource information for the instantiated computing resources may include information indicative of the function or the application of the instantiated computing resources, whether two or more computing resources serve the same function (e.g., a management function, a storage function, a processing function or any other function), whether two or more computing resources are being used for the same application, or any other suitable information regarding how resource management circuitry 130 (FIG. 7) controls and management computing resources. Based on the received computing resource information (e.g., in response to the received computing resource information), controller 18 may automatically establish one or more segments in EVPC tenancies for any instantiated computing resources (e.g., assignments of computing resources serving as end hosts to virtual ports for the segments).

As an example, controller 18 may receive computing resource information for instantiated computing resource 120-1 and computing resource 122-2 in FIG. 7 (e.g., MAC addresses and VLANs of computing equipment implementing computing resources 120-1 and 122-2 or other networking attributes of computing resources 120-1 and 122-2, information indicative of computing resources 120-1 and 122-2 being assigned to the same subnet or segment, etc.). Based on the received computing resource information, controller 18 may control underlying network switches to form segment 144-1 having a first virtual port coupled to (e.g., formed from) instantiated computing resource 120-1 and a second virtual port coupled to (e.g., formed from) instantiated computing resource 122-2 (based on the segment implementation process described above).

In this example, a port of leaf switch 1A (FIG. 7) connected to computing resource 120-1 may be associated with a first virtual port of the given segment 144-1 and a port of leaf switch 2B (FIG. 7) connected to computing resource 122-2 may be associated with a second virtual port of the given segment 144-1. In such a manner, the given segment 144-1 may be distributed across multiple underlying network switches (e.g., leaf switches 1A and 2B). If desired, an underlying network switch may be assigned to multiple segments (e.g., different VLANs on different ports of the same underlying network switch may be associated with different segments). In similar manner, controller 18 may also establish one or more additional segments such as segments 144-2, 144-3, etc. for corresponding instantiated computing resources (e.g., computing resources 120, 122, and/or 124 in FIG. 7).

Each EVPC tenant includes a virtual router (sometimes referred to as a logical router (LR/VR)) that is connected to the one or more network segments in the corresponding EVPC tenant. Controller 18 may implement the virtual router by assigning virtual router interfaces for the virtual router to corresponding IP domains associated with the one or more network segments in the corresponding EVPC tenant. These virtual router interfaces (and their IP domain assignments) may be implemented as associations in routing tables stored at corresponding underlying switches. As an example, EVPC tenant 148 may include virtual router 146. Virtual router 146 may include respective interfaces each assigned to (e.g., each connected to) a corresponding one of segments 144-1, 144-2, and 144-3 (e.g., each assigned to a corresponding subnet within EVPC tenant 148, etc.). Arrangements in which interfaces are defined by subnets are described herein as illustrative examples.

In the context of integrating the resource information from resource management circuitry 130 in FIG. 7 with the control scheme of controller 18 in FIG. 7, controller 18 may receive, over one or more links 134 (FIG. 7), computing resource information for the instantiated computing resources such as networking information. Based on the received computing resource information (e.g., in response to the received computing resource information), controller 18 may automatically establish virtual routers or EPVC tenancies for any instantiated resources (e.g., assignment of virtual router interfaces to corresponding segments in an EVPC tenant having the instantiated computing resources).

As an example, controller 18 may receive computing resource information for instantiated computing resource 120-1 and computing resource 122-2 in FIG. 7 (e.g., IP domains of segments assigned to computing equipment implementing computing resources 120-1 and 122-2 or other networking attributes of computing resources 120-1 and 122-2, information indicative of computing resources 120-1 and 122-2 being assigned to the same tenancy, etc.). Based on the received computing resource information, controller 18 may control underlying network switches to assign the subnet of segment 144-1 to a first interface of virtual router 146 (e.g., to connect segment 144-1 to the first interface of virtual router 146). In a similar manner (e.g., based on corresponding computing resources assigned to virtual ports of segments 144-2 and 144-3), controller 18 may control underlying network switches to assign the corresponding subnets of segments 144-2 and 144-3 to second and third interfaces of virtual router 146, respectively.

Configured in this manner, virtual routers (e.g., underlying switches implementing the virtual routers as configured by controller 18) such as virtual router 146 may perform network routing functions and provide isolation between the different segments (e.g., different subnets, different broadcast domains, etc.). In particular, to facilitate communication between different segments (e.g., within and/or external to a particular EVPC tenant), network routing functions performed by a virtual router may include modifying headers of network packets received at the virtual router interfaces.

As an example, the virtual router (e.g., an underlying switch implementing a function of the virtual router) may modify ethernet headers such as source and destination MAC address fields to corresponding to a desired segment (e.g., a desired subnet). In this example, each interface of the virtual router may be assigned a respective MAC address. The virtual router may rewrite the source MAC address field of the network packet to match an egress (i.e., outgoing) interface of the virtual router and may rewrite the destination MAC address field of the network packet to match a next-hop address (e.g., a MAC address of a system router). In contrast to virtual routers, a segment connection may not perform any network routing functions based on IP domains (e.g., may perform network traffic forwarding functions based on MAC address domains).

Physically, virtual routers such as virtual router 146 may be implemented as a virtualized element having distributed processing modules across one or more underlying physical and/or software switches for implementing its functions (e.g., formed from groups of underlying switches associated with the segments from which the virtual router is formed and based on which the corresponding virtual router interfaces are defined). A controller (e.g., controller 18) may control multiple physical switches to exhibit control for a single virtual router, and exhibiting control for two different virtual routers may involve controlling two different and potentially overlapping sets of underlying physical and/or software switches. In other words, the controller may provide configuration data to the underlying physical and/or software switches to define the virtual router interfaces (in addition to defining the previously mentioned virtual ports for segments) from the ports of the underlying physical and/or software switches. In such manner, a given underlying switch may serve as a portion of a virtual router (as well as a portion of a segment).

In similar manner, controller 18 may also establish one or more additional EVPC tenants each having corresponding virtual routers having interfaces assigned to segments for corresponding instantiated computing resources (e.g., computing resources 120, 122, and/or 124 in FIG. 7). All of these virtual routers (e.g., in EVPC network 136) may include interfaces coupled to a virtual system router (sometimes referred to herein as a logical system router (LSR/VSR) or a transit gateway). A controller such as controller 18 may implement the virtual system router by assigning virtual system router interfaces to virtual routers (e.g., virtual router interfaces). These virtual system router interfaces (and their virtual router interface assignments) may be implemented as associations in additional routing tables stored at corresponding underlying switches. As an example, virtual system router 138 may identify, at its interfaces, the corresponding virtual routers by their respective MAC addresses, by their respective data encapsulation schemes, by any other suitable schemes other than using IP addresses. In particular, virtual system router 138 may only be directly connected to (e.g., may only directly interact with) virtual routers in EVPC network 136 (e.g., without being directly connected to end hosts, without directly interacting with segment virtual ports, without being directly connected to external routers, etc.).

In the context of integrating the resource information from resource management circuitry 130 in FIG. 7 with the control scheme of controller 18 in FIG. 7, controller 18 may receive, over one or more links 134 (FIG. 7), computing resource information for the instantiated computing resources such as networking information. Based on the received computing resource information (e.g., in response to the received computing resource information), controller 18 may automatically establish a virtual system router or a system tenant for any instantiated resources (e.g., assignment of virtual system router interfaces to corresponding virtual routers or tenants having the instantiated computing resources).

As an example, controller 18 may receive computing resource information for instantiated computing resource 120-1 and computing resource 122-2 in FIG. 7 (e.g., MAC addresses of virtual routers with segments to which computing equipment implementing computing resources 120-1 and 122-2 are assigned, data encapsulation schemes associated with computing resources 120-1 and 122-2, or other networking attributes of computing resources 120-1 and 122-2, information indicative of computing resources 120-1 and 122-2 being assigned to the same EVPC cloud network, etc.). Based on the received computing resource information, controller 18 may control underlying network switches to assign or connect a virtual router (e.g., virtual router 146 (e.g., EVPC tenant 148) having segments with the instantiated computing resources 120-1 and 122-2) to an interface for virtual system router 138 for a system tenant, thereby providing a Transit Gateway function between EVPC tenant 148 and other EVPC tenants. In a similar manner (e.g., based on other corresponding virtual router interfaces information for other tenants), controller 18 may control underlying network switches to assign the corresponding virtual routers to virtual system router interfaces.

Configured in this manner, a virtual system router (e.g., an underlying switch implementing a function of the virtual system router) such as virtual system router 128 may perform network routing functions and provide isolation between different VPC tenants. In particular, to facilitate communication between different VPC tenants, network routing functions performed by a virtual system router may include modifying headers of network packets received at the virtual system router interfaces. As an example, the virtual system router may modify ethernet headers such as source and destination MAC address fields to corresponding to a desired virtual router (e.g., a desired VPC tenant). In this example, each interface of the virtual system router may be assigned a respective MAC address. The virtual system router may rewrite the source MAC address field of the network packet to match an egress (i.e., outgoing) interface of the virtual system router and may rewrite the destination MAC address field of the network packet to match a next-hop address (e.g., a MAC address of a virtual router).

In other words, a virtual system router such as virtual system router 138 may route data exclusively between different virtual routers (e.g., between different virtual router interfaces). In particular, an underlying switch processing the functions of the virtual system router may only interact directly with network packets associated with virtual router interfaces. If desired, the virtual system router may apply and enforce inter-tenancy network policies for routing packets between different VPC tenants.

Physically, a virtual system router such as virtual system router 138 may be implemented as a virtualized element having distributed processing modules across one or more underlying physical and/or software switches for implementing its functions (e.g., formed from groups of underlying switches that are associated with the corresponding virtual routers from which the virtual system router is formed and based on which the corresponding virtual system router interfaces are defined). Analogously, a controller (e.g., controller 18) may control multiple physical switches to exhibit control for a single virtual system router, and exhibiting control for two different virtual system routers (if implemented) may involve controlling two different and potentially overlapping sets of underlying physical and/or software switches. In other words, the controller may provide configuration data to the underlying physical and/or software switches to define the virtual system router interfaces (in addition to defining the previously mentioned virtual ports for segments and virtual router interfaces) from the ports of the underlying physical and/or software switches. In such manner, a given underlying switch may serve as a portion of a virtual system router (as well as a portion of a segment and/or a virtual router).

In general, a controller (e.g., controller 18) that receives computing resource information (e.g., from resource management circuitry) and uses the computing resource information may control network switches to implement the EVPC network in a top-down manner. In the example of FIG. 8, based on the received computing resource information, the controller may implement or form EVPC network 136 (if non-existent), and if desired, a corresponding system tenant, before implementing EVPC tenant 146. Similarly, based on the received computing resource information, the controller may implement or form EVPC tenant 146 (if non-existent) before implementing the segments to which computing resources are assigned. In such a manner, the controller may properly assign computing resources to segments, segments to virtual router interfaces, virtual routers to virtual system router interfaces, etc.

Switch Modules for Network Virtualization

Figure 9:
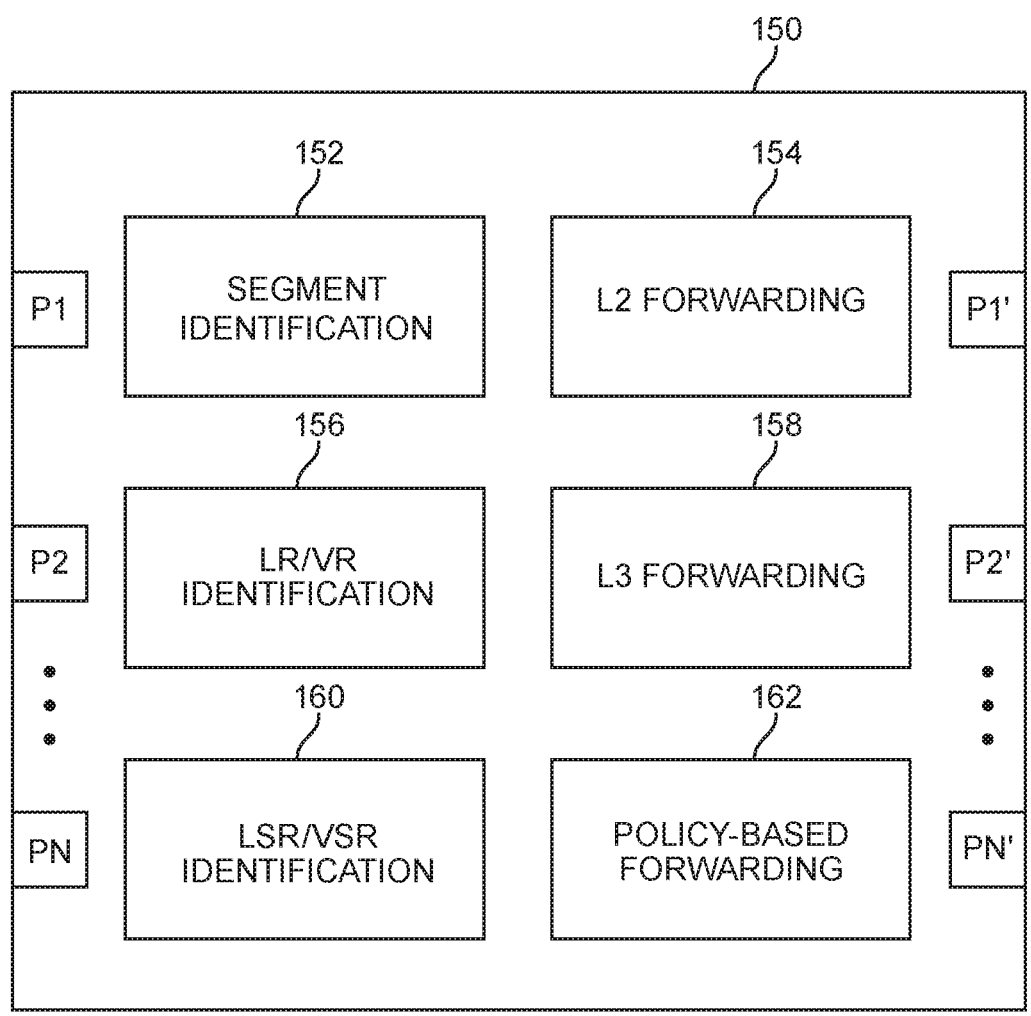
FIG. 9 is a diagram of an illustrative switch having modules that each perform different packet forwarding functions (e.g., switch functions and routing functions) in accordance with some embodiments.

In order to implement the illustrative virtual elements described in connection with FIG. 8 over underlying physical and/or software switches described in connection with FIG. 6 or 7, the underlying switches may be configured to implement multiple types of forwarding operations (e.g., switching and/or routing functions). FIG. 9 is an illustrative block diagram of a switch 150 such as a physical or software switch that may store different types of configuration data for performing packet forwarding and routing based on virtual elements as described in connection with FIG. 8. Switch 150 may, for example, be a leaf switch such as leaf switches 1A, 1B, 2A, or 2B of FIG. 7 (or a corresponding core switch in FIG. 6) or may be a spine switch such as spine switches 1 or 2 of FIG. 7 (or a corresponding core switch in FIG. 6). In other words, switch 150 may be an underlying switch, which includes circuitry for implementing the virtual elements described in connection with FIG. 8. Controller circuitry 18 (FIG. 7), based on received computing resource information, may provide corresponding data to one or more modules of switch 150 to implement the private cloud elements in FIG. 8, as an example.

As shown in FIG. 9, switch 150 may include ports such as ports P1, P2, . . . , PN, P1', P2', . . . , PN', etc. (i.e., any suitable number of input ports, output ports, shared input-output ports, etc.). Switch 150 may include segment identification module 152, L2 forwarding module 154, logical or virtual router identification module 156, L3 forwarding module 158, logical or virtual system router identification module 160, and policy-based forwarding module 162. The modules may be implemented using respective dedicated circuitry, may be implemented using shared dedicated circuitry, or may be implemented using software processed on processing circuitry (e.g., by processing software instructions stored on memory circuitry such as non-transitory computer-readable storage media accessed by the processing circuitry). For example, these modules may be implemented using packet processing software 26 on control unit 24 of FIG. 1 (e.g., processing packet processing software stored on memory circuits of control circuit 24) and/or packet processing circuitry 32. These modules may perform functions based on stored flow table entries or other configuration or control data provided by a controller such as controller 18.

A network packet received at one of the switch ports may be processed by one or more of the modules in determining how to forward the network packet. The modules may process the network packet in any desired sequence or in parallel. The operations performed by each module may be controlled by a controller such as controller 18.

Segment identification module 152 may determine a segment within a given EVPC tenant that a received network packet is assigned to. This may be determined based on network attributes associated with the network packet (e.g., incoming port, VLAN, source address information such as source MAC or IP address, etc.). As an example, the network attributes may be indicative of a virtual port of a segment the source end host is attached to. Module 152 may provide information identifying the segment (e.g., the segment virtual port) to L2 forwarding module 154. L2 forwarding module 154 may perform network forwarding based on the segment information provided by module 152 (e.g., perform forwarding decisions at layer 2 of the Open Systems Interconnection (OSI) model). For example, L2 forwarding module 154 may determine an underlying physical or software switch port that the received network packet should be forwarded to. This may be determined based on the segment information and additional packet information such as a destination MAC address retrieved from the received network packet.

Configured with segment identification module 152 and L2 forwarding module 154, switch 150 (in combination with other similarly configured switches) may perform forwarding functions within a segment as described in connection with FIG. 8 (e.g., to implement the functions of segments 144-1, 144-2, and 144-3 corresponding to different subnets in EVPC tenant 148). As an illustrative example in connection with FIG. 8, a network packet sent from a first computing resource 142-1 in segment 144-1 and destined for a second computing resource 142-1 in segment 144-1 may be forwarded using segment identification module 152 and L2 forwarding module 152 in an intervening physical or software switch 150, which implements the segment forwarding functions of segment 144-1.

In scenarios such as when a destination end host of a received network packet is associated with a different subnet or segment than the source end host, switch 150 may use virtual router identification module 156 and L3 forwarding module 158 to performing routing operations. As an example in connection with FIG. 8, a network packet sent from computing resource 142-1 that is destined for computing resource 142-2 may be processed using L3 forwarding module 158, because computing resource 142-1 is assigned to a virtual port for segment 144-1, whereas computing resource 142-2 is assigned to a virtual port for segment 144-2. In other words, the IP domain (e.g., a first subnet) that is associated with computing resource 142-1 is different from the IP domain (e.g., a second subnet) that is associated with computing resource 142-2. In these scenarios, network routing at the IP layer (e.g., level 3 of the OSI model) may be required.

Virtual router identification module 156 may identify an associated EVPC tenant (e.g., a virtual router for the EVPC tenant) that should be used in controlling the network packet. Module 156 may use network attributes of the network packet along with information received from other modules of the switch. For example, module 156 may use identified EVPC segment information received from L2 forwarding module 154 along with IP address information retrieved from the network packet in determining which virtual router (for which EVPC tenant) controls the network packet. In particular, the segment information may identify virtual router interfaces of a virtual router that are assigned to the subnets associated with the IP address information from the network packets.

Virtual router identification module 156 may provide the identified EVPC tenant information (e.g., virtual router information) to L3 forwarding module 158. L3 forwarding module 158 may perform network routing operations based on the identified EVPC tenant information and based on additional information retrieved from the network packet. As an example, L3 forwarding module 158 may use IP header fields such as destination address fields to determine which port of switch 150 should be used in forwarding the network packet. In performing network routing operations, L3 forwarding module 158 may modify the network packet. For example, module 158 may decrement a (time-to-live) TTL header field and may rewrite layer 2 header fields such as source and destination MAC addresses.

As an illustrative example in connection with FIG. 8, a network packet sent from computing resource 142-1 in segment 144-1 of EVPC tenant 148 may be destined for computing resource 142-2 in segment 144-2 of EVPC tenant 148. In this example, the network packet may include the MAC address of computing resource 142-1 as a source MAC address, the MAC address of virtual router 146 as the destination MAC address (because computing resource 142-1 is coupled to a different L3 interface of virtual router 146 than computing resource 142-2 and may not have access to the MAC address of computing resource 142-2), the IP address of computing resource 142-1 as a source IP address, and the IP address of computing resource 142-2 as a destination IP address. Virtual router identification module 156 may determine that the source computing resource 142-1 is within segment 144-1 and is coupled to the first subnet interface of virtual router 146. L3 forwarding module 158 may determine that destination computing resource 142-2 is within segment 144-2 and is coupled to the second subnet interface of virtual router 146-1, and may perform network routing operations in routing the network packet to computing resource 142-2 via the second subnet interface of virtual router 146 (e.g., based on flow table entries provided by a controller). The network routing operations may include decrementing a TTL field of the network packet and rewriting the source and destination MAC addresses of the network packet. In particular, the source MAC address may be rewritten from the MAC address of computing resource 142-1 to the MAC address of the second subnet interface of virtual router 146, whereas the destination MAC address may be rewritten from the MAC address of the first subnet of virtual router 146 to the MAC address of computing resource 142-2.

Switch 150 may include policy-based forwarding module 162 that may process the network packets after the packets have been processed by L2 forwarding module 154 and/or L3 forwarding module 158 (e.g., packets may be passed to module 162 prior to passing the packets to an egress port on switch 150). Module 162 may serve as an override to forwarding modules 154 and 158 in determining which port to route data packets to. Module 162 may perform network routing and network access control operations based on network policy rules identified by controller 18 and information retrieved from the network packet.

If desired, switch 150 may also include virtual system router identification module 160 that identifies a virtual system router should be used in controlling the network packet. The virtual system router identification module may identify which virtual system router should be used in controlling the network packet and may use network attributes of the network packet along with information received from other modules of the switch. The virtual system router identification module may provide virtual system router information to L2 forwarding module 154, L3 forwarding module 158, and/or policy-based forwarding module 162. Modules 154, 158, and 162 may perform network routing operations based on the identified virtual system router information and based on information retrieved from the network packet.

In scenarios such as when a destination end host of a received network packet is associated with an EVPC tenant (e.g., a different virtual router) than the source end host, switch 150 may use virtual system router identification module 160 (and L2 forwarding module 154 and/or policy-based forwarding module 162) for performing forwarding operations. As an example, in connection with FIG. 8, a network packet sent from computing resource 142-1 in segment 144-1 of EVPC tenant 148 may be destined for an end host external to EVPC tenant 148. In other words, the EVPC tenancy associated with source end host is different from the EVPC tenancy associated with destination end host. In these scenarios, network routing at a virtual system router level may be required. In particular, any suitable network attributes may be used to identify the different virtual system router interfaces at which the corresponding virtual routers for the different EVPC tenants are connected, thereby providing the appropriate forwarding between different EVPC tenants.

Referring back to module 162 in FIG. 9, controller 18 (FIG. 6 or 7) may be used to apply and enforce network policy rules at virtual interfaces of the virtual network such as EVPC network 136 in FIG. 8 (e.g., virtual ports of distributed segments, interfaces of distributed virtual routers, or interface of virtual system routers). Network policy rules may include network routing rules (sometimes referred to herein as policy-based routing (PBR) rules) that help determine network paths between end hosts and may include access control lists that allow or block selected network traffic. If desired, controller 18 may receive access control list and/or network routing rules from a user as the network policy rules (e.g., the user may specify an access control list and network routing rules simultaneously to controller 18). Controller 18 may provide forwarding rules implementing the access control list policy rules and network routing rules (e.g., as flow table entries or as other types of control and configuration data) for implementation on module 162 of switches 150.

In general, any desired network attributes such as one or more virtual ports, virtual router and system router interfaces, physical ports and/or packet header fields may be identified in an access control list to specify a suitable policy for network 100 in FIG. 6 or 7 and for EVPC network 136 in FIG. 8. Controller 18 may generate flow table entries for the underlying switches in network 100 that implement the network policy rule defined by such an access control list.

The flow table entries may be provided to one or more physical or hypervisor switches in implementing the access control list (e.g., for implementation on module 162 of switch 150 as shown in FIG. 9). In scenarios where the access control list is combined with a policy-based routing entry that is provided by a user, flow table entries having an action field for forwarding the data packet to a desired destination may also be generated. If desired, flow table entries implemented on switch 150 for module 162 may process data packets after the packets have been processed by L2 forwarding module 154 and/or L3 forwarding module 158. If desired, module 162 may override the forwarding determinations made at modules 154 and 158.

The modules of the switch 150 may collectively implement a flow table such as flow table 28. For example, flow table entries operating only on layer 2 header fields may be implemented using (e.g., may be stored at) segment identification module 152 and L2 forwarding module 154. As another example, flow table entries operating only on layer 3 header fields may be implemented using (e.g., may be stored at) virtual router identification module 156 and L3 forwarding module 158. As yet another example, flow table entries operating on both layer 2 and layer 3 header fields may be implemented using (e.g., stored at) segment identification module 152, L2 forwarding module 154, virtual router identification module 156 and L3 forwarding module 158. Flow table entries implemented on (e.g., stored at) virtual system router identification module 160 and policy-based routing module 162 may operate on any desired fields of the received packets.

The example of FIG. 9 in which modules 152, 154, 156, 158, 160, and 162 are implemented separately is merely illustrative. If desired, the functions of any two or more modules may be merged and implemented using shared circuitry. The modules may be implemented as software modules in a software switch such as a hypervisor switch or may be implemented using dedicated circuitry. Each switch 150 may be capable of performing both network forwarding and network routing, which helps to allow a controller to implement distributed network segments, virtual routers, and virtual system routers. If desired, one or more of these modules may be omitted from one or more of switches 150. If desired, a first switch in a network may be configured to implement the functions of traffic forwarding within segments and the functions of packet routing for virtual routers between different segments, and a second switch in the network may be configured to implement the functions of packet routing for a virtual system router between virtual router.

The configurations of FIGS. 7 and 8 showing how controller 18 may configure network 100 to form one or more EVPC tenants within a single EVPC network 136 using information from resource management circuitry 130 are merely illustrative. If desired, controller 18 may be configured to control switches to form one or more EVPC networks using information from one or more different resource management circuitry (sometimes referred to herein as one or more different resource management systems or platforms).

Networking Systems Having Multiple Resource Management Systems

Figure 10:
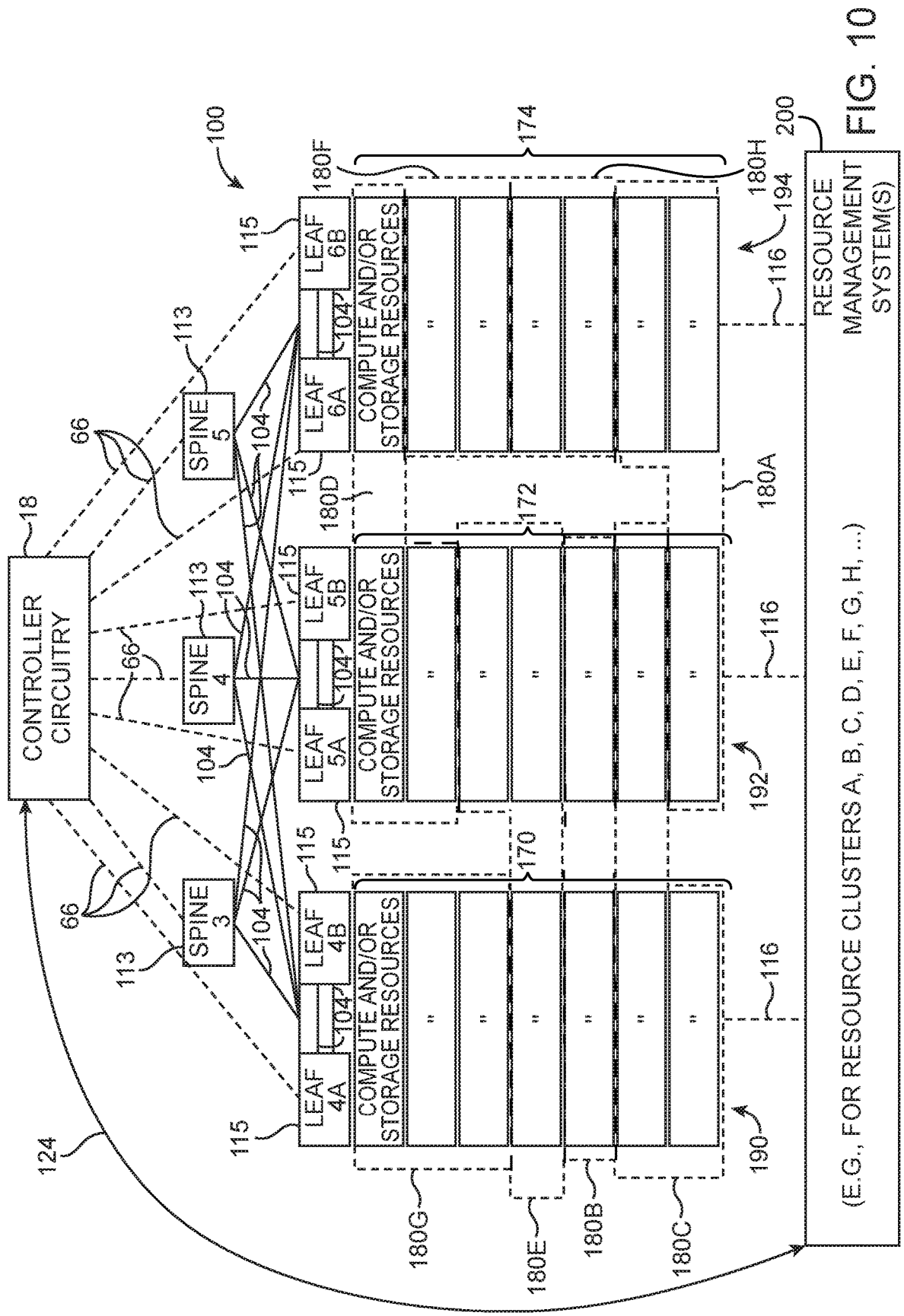
FIG. 10 is a diagram of an illustrative rack-based system having network switch controller circuitry communicatively coupled to one or more computing resource management systems implementing multiple computing resource clusters in accordance with some embodiments.

As shown in FIG. 10, computing resources managed by one or more different resource management systems and coupled to network 100 may be partitioned to form different VPC networks. In the example of FIG. 10, controller 18 is coupled to switches 113 and 115 via control paths 66. Each spine switch 113 is coupled to each of leaf switches 115 via data paths 104. Each pair of leaf switches 115 at the same rack is coupled to each other via data paths 104 (e.g., peer data paths). Top of the rack switches (leaf switches 115) may be coupled to each of the computing resources in the corresponding rack via data paths (as similarly described in connection with FIG. 7). As an example, leaf switch 4A may be coupled to each of computing resources 170 in network rack 190, and similarly, leaf switch 4B may be coupled to each of computing resources 170. These interconnections of switches and end hosts in network 110 are merely illustrative. If desired, any suitable interconnections may be formed between these network elements and other network elements.

One or more resource management systems 200 are coupled to and are configured to control computing resources 170 in rack 190, computing resources 172 in rack 192, and computing resources 174 in rack 194 via paths 116. Each of the resource management systems 200 may be configured to provision and instantiate different computing resources spanning different network racks as a computing resource cluster (e.g., for a compute function, for a storage function, for a management function, etc.). In the illustrative example of FIG. 10, computing resources 170, 172, and 174, across network racks 190, 192, and 194 are be partitioned into different computing resource clusters 180A, 180B, . . . , 180H.

As a first example, all of the different computing resource clusters may be controlled by a single resource management system 200. In this scenario, the single resource management system 200 may be seek to isolate each of the computing resource clusters from each other. In other words, each of the computing resource clusters may be a separate instance of the same type of cloud network (e.g., orchestrated by the single resource management system 200). Controller 18 may therefore configure network 100 (e.g., underlying switches in network 100) to form different VPC networks from each of the different computing resource clusters.

As a second example, each of the different computing resource clusters may be controlled by a different resource management system (e.g., collectively, a set of resource management systems 200). In this scenario, a first resource management system may be configured to form a first computing resource cluster for a first cloud network, a second resource management system may be configured to form a second computing resource cluster for a second cloud network, and so on. Controller 18 may similarly configure network 100 (e.g., underlying switches in network 100) to form different VPC networks from each of the different computing resource clusters (each of which is generated by a different resource management system).

These two examples are merely illustrative. If desired, one or more computing resource clusters may be controlled (e.g., managed, orchestrated, etc.) by the same resource management system, while one or more other resource clusters may be controlled by a different resource management system. Any mapping of the number of resource management systems to the number of computing resource clusters can be used.

To efficiently realize these number and types of computing resources instantiated, controller 18 is communicatively coupled to one or more resource management systems 200 via communications path 134 such as one or more APIs. If desired, communications path 134 may be implemented in any suitable manner as described in connection with FIG. 7. Controller circuitry 18 and each of the systems 200 may include corresponding interface elements or circuitry for supporting these APIs (e.g., similar to those described in connection with FIG. 7). Controller 18 may be configured to access the memory circuitry storing instantiated computing resource information at each of the one or more resource management systems 200 (via a corresponding API).

Based on the instantiated computing resource information, controller 18 may provide control signals and control data to switches in network 100 (e.g., underlying spine switches 113 and leaf switches 115) to form private cloud elements. In particular, controller 18 may supply data corresponding to one or more modules in one or more of the underlying switches in network 100 (e.g., modules 152, 154, 156, 158, 160, 162 in switch 150 as described in FIG. 9).

As an example, controller 18 may receive computing resource information from a first resource management system specifying networking information for a set of instantiated computing resources 172 in rack 192 and for two sets of instantiated computing resources 174 in rack 194 (collectively forming computing resource cluster 180A). In response to receiving the computing resource information over link 134 (e.g., by accessing corresponding memory circuitry in the first resource management system), controller circuitry 18 may form a VPC network associated with computing resource cluster 180A (e.g., a first EVPC network having tenants, segments, virtual routers, virtual system routers, and other virtual network elements as described in connection with EVPC network 136 in FIG. 8). In particular, the VPC network may include one or more tenants, each of which may include one or more segments, each of which may have ports or connection to the computing resources in computing resource clusters 180A.

As another example, controller 18 may receive computing resource information from the first resource management system (or a second resource management system different from the first resource management system) specifying networking information for a set of instantiated computing resources 170 in rack 190 and for a set of instantiated computing resources 172 in rack 192 (collectively forming computing resource cluster 180B). In response to receiving the computing resource information over link 134 (e.g., by accessing corresponding memory circuitry in the corresponding resource management system), controller circuitry 18 may form a VPC network associated with computing resource cluster 180B (e.g., a second EVPC network having tenants, segments, virtual routers, virtual system routers, and other virtual network elements as described in connection with EVPC network 136 in FIG. 8). In particular, the VPC network may include one or more tenants, each of which may include one or more segments, each of which may have ports or connection to the computing resources in computing resource clusters 180B).

In a similar manner, controller 18 may receive any suitable set of computing resource information (e.g., from all of the resource management systems controlling computing resources coupled to network 100) associated with any of the computing resource clusters 180. Two or more VPC networks formed may be multiple instances of the same (type of) network stemming from multiple computing clusters controlled by the same resource management system.

Because controller 18 is configured to access each of the resource management systems (e.g., via corresponding communications links 134), controller 18 can automatically and flexibly interact with computing resources even as numerous computing resources are instantiated and updated or generally managed in a complex and high-scale manner. Accordingly, controller 18 may configure switches in an underlying network 100 to form private cloud features that connect, isolate, or otherwise control the flow of network traffic between the computing resource clusters and within each of the computing resource clusters.

Figure 11:
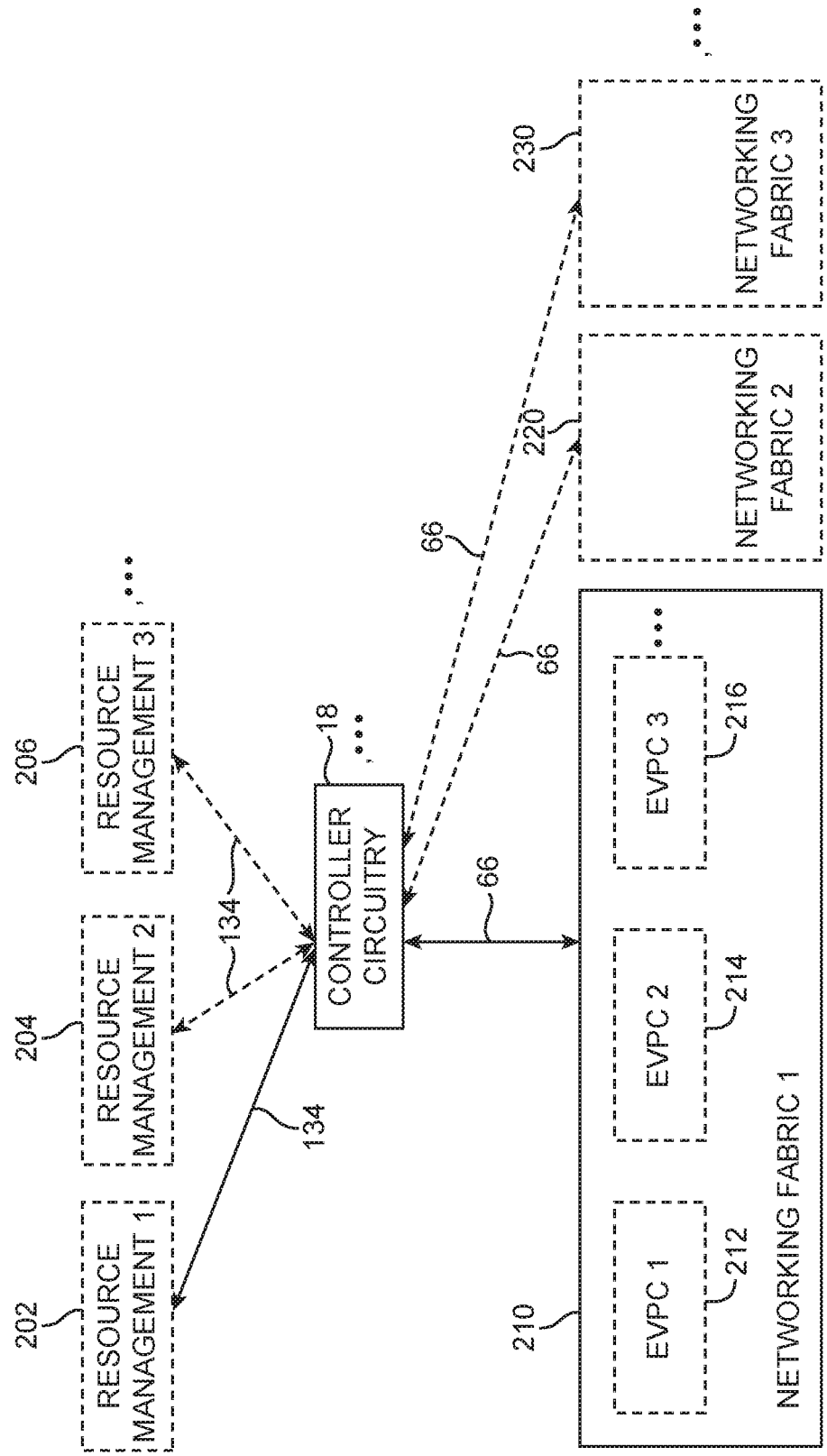
FIG. 11 is a diagram of private cloud elements generated using network switch controller circuitry based on computing resource information from one or more resource management systems in accordance with some embodiments.

FIG. 11 is an illustrative diagram of controller 18 configured to simultaneously interacting with (e.g., accessing) multiple resource management system (or one system, if desired) and simultaneously interacting with (e.g., controlling) multiple networking fabrics (or one fabric, if desired). As shown in FIG. 11, controller 18 is communicatively coupled to one or more resource management systems 202, 204, 206, etc. via one or more corresponding links 134. In other words, controller 18 may simultaneously integrate information from any suitable number of resource management systems (e.g., enterprise cloud platforms) for managing and orchestrating computing resources. Accordingly, controller 18 may assign computing resources controlled by each of the enterprise cloud platforms to corresponding VPC elements (e.g., to corresponding EVPC networks having respective tenants with respective segments in the process described in connection with FIG. 8). In particular, as described in connection with FIGS. 7 and 8, by providing control signal 66 to networking fabric 210 (e.g., a set of interconnected switches such as network 100), controller 18 may form one or more EVPC networks 212, 214, 216, etc., each of which may corresponding to one of the resource management systems (or some of which may correspond to different instances for the same resource management system). In forming these EVPC networks, controller 18 may ensure independence of each of these computing resource clusters (from corresponding resource management systems) from each other even though the computing resource clusters may be coupled to the same networking fabric and formed on the same network racks.

If desired, controller circuitry 18 may be configured to provide control signals 66 to separate networking fabrics (e.g., each having corresponding sets of switches, the corresponding sets of switches not being connected to each other). Controller circuitry 18 may be configured to control the different sets of switches in different networking fabrics 210, 220, 230 (e.g., different sets of interconnected switches isolated from each other) to form different VPC elements such as separate VPC networks having tenants based on resource management systems that may span across the different networking fabrics (e.g., may control computing resources coupled to each of these networking fabrics). As a particular example, resource management system 202 may control computing resources coupled to networking fabric 210 and may control computing resources coupled to networking fabric 220 (e.g., in a scenario in which there are multiple availability zones for resource management system 202). In this example, controller circuitry 18 may control a first set of switches in networking fabric 210 to form a first VPC network within networking fabric 210 and may control a second set of switches in networking fabric 220 to form a second VPC network within networking fabric 220 (both of which may be associated with resource management system 202).

Figure 12:
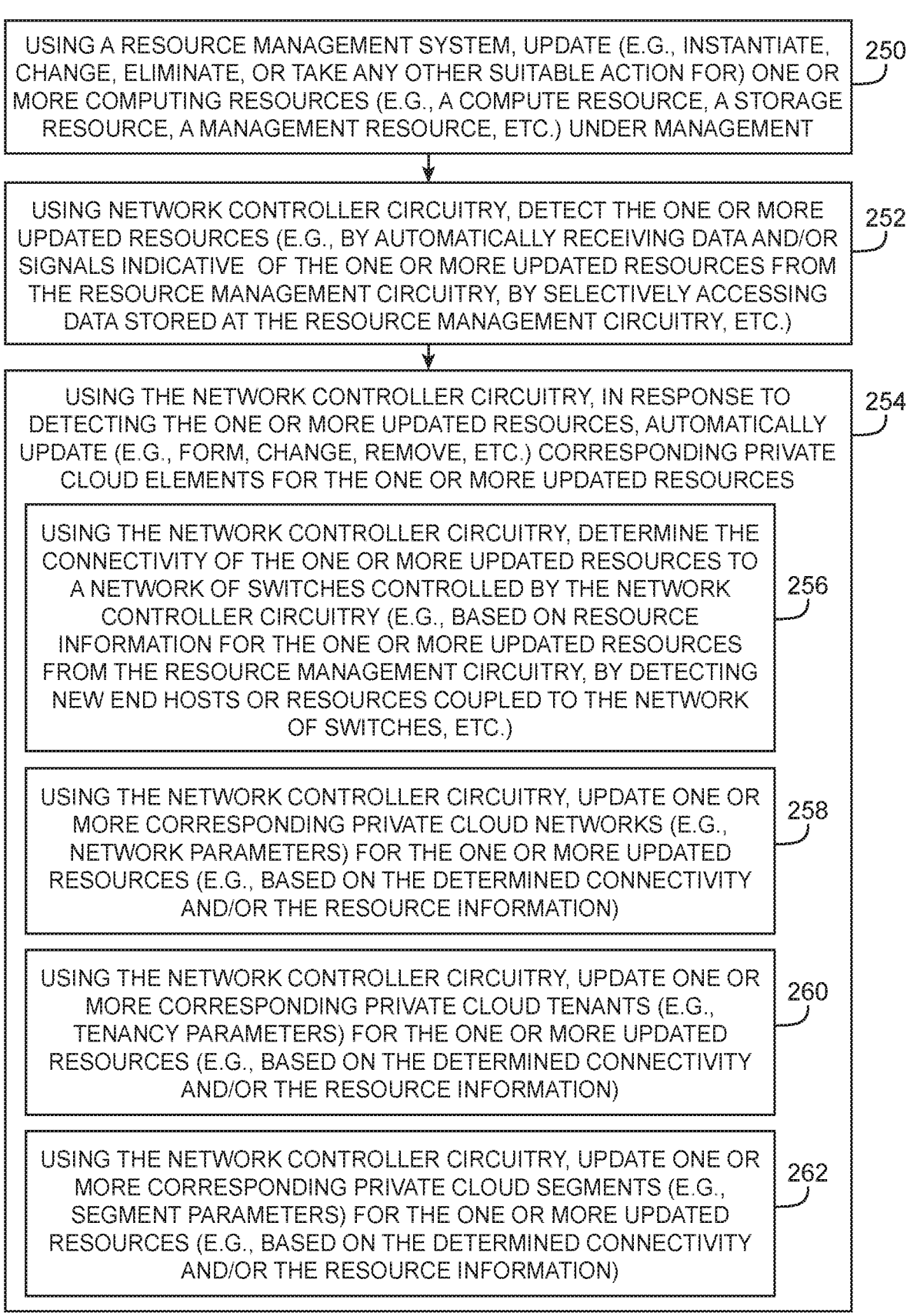
FIG. 12 is a flowchart of illustrative steps for integrating computing resource information into the control and management of network switches by controller circuitry in accordance with some embodiments.

FIG. 12 is an illustrative flowchart for integrating a resource management system (e.g., resource management circuitry 130 or system 200) with network controller circuitry (controller circuitry or controller 18). In particular, based on the integration, the network controller circuitry may form corresponding private cloud elements by providing control signal and control data to corresponding switches in one or more networking fabrics. The software instructions for the steps of FIG. 12 may be stored at any suitable storage media (e.g., corresponding non-transitory computer-readable storage medium at the controller circuitry, at switch circuitry controlled by the controller circuitry, and/or at the resource management circuitry) and may be processed at any suitable processing circuitry (e.g., corresponding processing circuitry at the controller circuitry, at the switch circuitry, and/or the resource management circuitry).

At step 250, the resource management system may update (e.g., instantiate, change, eliminate, or take any other suitable action for) one or more computing resources (e.g., one or more of compute resources, storage resources, management resources, etc., which are generally referred to herein as computing resources). As an example, the resource management system may control computing equipment to instantiate one or more computing resources as a computing resource cluster for collectively performing any suitable function. The resource management system may instantiate multiple sets of such computing resource clusters, if desired. As another example, the resource management system may control computing equipment to eliminate one or more already instantiated computing resources. If desired, the resource management system may change parameters associated with (e.g., update the functions of, update the network properties of, etc.) already instantiated computing resources.

At step 252, the network controller circuitry may detect the one or more updated resources (e.g., by automatically receiving data and/or signal indicative of the one or more updated resources from the resource management circuitry, by selectively accessing data stored at the resource management circuitry, etc.). As an example, prior to step 252, the network controller circuitry and the resource management circuitry may form a communications link (e.g., one or more links 134). The network controller circuitry may receive the information indicative of the detection of the resource updates via one or more communications links such as one or more APIs or other links to the resource management system.

At step 254, the network controller circuitry, in response to detecting the one or more updated resources (e.g., one or more computing resource updates), may automatically update (e.g., form, change, remove, etc.) corresponding private cloud elements for the one or more updated resources. In particular, processing step 254 may include processing one or more of steps 256, 258, 260, and 262.

At step 256, the network controller circuitry may determine the connectivity of the one or more updated resources to a network of switches controlled by the network controller circuitry (e.g., based on resource information for the one or more updated resources from the resource management circuitry, by detecting new resources, removed resources, or otherwise changed resources to couple to or decoupled from the network switches, etc.). As examples, the resource information may include networking information for the updated resources, the type of resource update (e.g., instantiate, change or remove), physical placement for the updated resources, any other suitable types of information. Additionally, in response to the received information, the network controller may also automatically identify one or more switch ports at corresponding switches directly connected to the updated resources (e.g. newly instantiated resources) and may form link aggregation groups based on the connections to the updated resources. The switch port identification information and link aggregation group information may subsequently be used to update the private cloud network elements in a desirable manner. If desired, the switch port identification information and link aggregation group information may be gathered and formed independently from the network virtualization process (e.g., may be gathered and formed even when private cloud network elements are not formed).

At step 258, the network controller circuitry may update one or more corresponding private cloud networks (e.g., network parameters) for the one or more updated resources (e.g., based on the determined connectivity and/or resource information). As an example, the network controller circuitry may provide control signal and control data (e.g., networking information such as network name, network type, network connectivity, network policy associated the private cloud network) to a network of underlying switches for forming one or more private cloud networks such as EVPC 136 in FIG. 7.

At step 260, the network controller circuitry may update one or more corresponding private cloud tenants (e.g., tenancy parameters) for the one or more updated resources (e.g., based on the determined connectivity and/or resource information). As an example, the network controller circuitry may provide control signals and control data (e.g., networking information such as virtual router interface assignment, tenant policy, etc.) to the network of underlying switches for forming one or more tenants such as EVPC tenant 148 in FIG. 7.

At step 262, the network controller circuitry may update one or more corresponding private cloud segments (e.g., segment parameters) for the one or more updated resources (e.g., based on the determined connectivity and/or resource information). As an example, the network controller circuitry may provide control signals and control data (e.g., networking information such as segment port assignment, segment policy, etc.) to the network of underlying switches for forming one or more segments such as segments 144 in FIG. 7.

The examples in which new private cloud networks, tenants, and segments are formed or implemented at the underlying switches are merely illustrative. If desired, the network controller circuitry may also remove or otherwise change private cloud networks, tenants, and segments based on the corresponding changes to computing resources by the resource management system.

The example of FIG. 12 including steps for the network controller circuitry interacting with a single resource management system is merely illustrative. If desired, the network controller circuitry may interact simultaneously with multiple resource management systems over parallel communications links and update private clouds elements based on information from each of the resource management systems (e.g., by processing the steps of FIG. 12 for each of the multiple resource management systems).

The foregoing is merely illustrative of the principles of this invention and various modifications can be made by those skilled in the art without departing from the scope and spirit of the invention.

What is claimed is:

1. A networking system comprising:
 a switch configured to forward network traffic for an end host coupled to the switch, the end host including computing equipment on which a computing resource is instantiated by a computing resource management system;
 a controller coupled to the switch and having a computing resource management interface, the computing resource management system being external to the controller and external to the switch, wherein the resource management interface of the controller is coupled to the resource management system via a communications link and configured to receive computing resource information for the computing resource from the computing resource management system via the communications link, and wherein the controller is configured to provide control data to the switch to update a cloud network for the computing resource based on the computing resource information received from the computing resource management system.

2. The networking system defined in claim 1, wherein the received computing resource information comprises networking information for the computing resource, and the controller is configured to provide the control data to the switch to update a network segment in the cloud network, the network segment having a port assigned to the networking information for the computing resource.

3. The networking system defined in claim 2, wherein the controller is configured to provide the control data to the switch to update a network tenant in the cloud network, the network tenant having a virtual router with an interface assigned to the networking information for the computing resource.

4. The networking system defined in claim 3, wherein the controller is configured to provide the control data to the switch to update a network system tenant in the cloud network, the network system tenant having a virtual system router with an interface assigned to the networking information for the computing resource.

5. The networking system defined in claim 1, wherein the computing resource information is stored at the computing resource management system and the computing resource management interface is configured to access the computing resource information stored at the computing resource management system via the communications link.

6. The networking system defined in claim 5, wherein the communications link comprises an application programming interface.

7. The networking system defined in claim 1, wherein the computing resource management system is configured to instantiate the computing resource by providing a control signal to computing equipment for implementing the computing resource.

8. The networking system defined in claim 7, wherein the switch is coupled to an additional computing resource controlled by the computing resource management system, and wherein the computing resource management system is configured to instantiate the additional computing resource by providing an additional control signal to additional computing equipment for implementing the additional computing resource, and is configured to form a computing resource cluster using the computing resource and the additional computing resource.

9. The networking system defined in claim 8, wherein the computing resource cluster is configured to perform a function selected from the group consisting of a compute function, a storage function, and a management function.

10. A method of operating controller circuitry to control a plurality of switches coupled to a computing resource forming an end host, the method comprising:
 receiving, from a computing resource management system via an application programming interface, computing resource information identifying a creation of the computing resource, wherein the computing resource management system is configured to create the computing resource and additional computing resources on computing equipment coupled to the plurality of switches; and
 in response to receiving the computing resource information from the computing resource management system, identifying a switch port of a given switch in the plurality of switches directly connected to the computing resource based on the received computing resource information.

11. The method defined in claim 10, further comprising:
 in response to identifying the switch port, forming a link aggregation group for the computing resource from a link between the switch port and the computing resource.

12. The method defined in claim 10, wherein the computing resource information comprises networking information for the computing resource, the method further comprising:

using the controller circuitry, controlling the plurality of switches to form a cloud network based on the networking information for the computing resource.

13. The method defined in claim 12, wherein controlling the plurality of switches to form the cloud network comprises providing control data to the given switch to assign the computing resource to a virtual port of a network segment in the cloud network.

14. The method defined in claim 13, wherein the virtual port of the network segment is formed at least in part from the identified switch port of the given switch.

15. The method defined in claim 13, wherein controlling the plurality of switches to form the cloud network comprises providing the control data to the given switch to form a tenant in the cloud network by assigning the network segment to an interface of a virtual router associated with the tenant, and providing the control data to the given switch comprises providing information indicative of the network segment to a segment identification module in the given switch and providing information indicative of the virtual router to a virtual router identification module in the given switch.

16. A non-transitory computer-readable storage medium comprising instructions that, when executed by processing circuitry for a network controller, cause the processing circuitry to:
receive, from a resource management system external to the network controller information indicative of a plurality of computing resources created on computing equipment by the resource management system and orchestrated by the resource management system to collectively form a computing resource cluster; and
send configuration data, generated based on the information received from the resource management system, to a network switch to form a cloud network by configuring the network switch to implement a network segment for the computing resource cluster.

17. The non-transitory computer-readable storage medium defined in claim 16, further comprising instructions that, when executed by the processing circuitry, cause the processing circuitry to:
receive, from an additional resource management system configured to control an additional plurality of computing resources, additional information for an additional computing resource in the additional plurality of computing resources, wherein the plurality of computing resources and the additional plurality of computing resources are implemented in a rack-based system, and the plurality and additional plurality of computing resources are distributed across a network rack in the rack-based system.

18. The non-transitory computer-readable storage medium defined in claim 17, further comprising instructions that, when executed by the processing circuitry, cause the processing circuitry to:
configure the network switch to form an additional cloud network by configuring the network switch to implement an additional network segment for the additional computing resource based on the additional information from the additional resource management system.

19. The non-transitory computer-readable storage medium defined in claim 16, further comprising instructions that, when executed by the processing circuitry, cause the processing circuitry to:
configure a first networking fabric, in which the network switch is disposed, to form the cloud network; and
configure a second networking fabric that is separated from the first networking fabric based on additional information received from the resource management system indicative of additional computing resources managed by the resource management system, additional computing resources being coupled to the second networking fabric.

20. The network system defined in claim 1, wherein the computing resource management system is configured to form a computing resource cluster at least in part by instantiating the computing resource and one or more additional computing resources.

* * * * *